(12) United States Patent
Pena

(10) Patent No.: US 6,200,067 B1
(45) Date of Patent: Mar. 13, 2001

(54) MULTI-PURPOSE WATER BAG ASSEMBLY WALL SYSTEM AND METHOD

(76) Inventor: Martin Rangel Pena, 11039 Painted Tree Rd., Charlotte, NC (US) 28226

( * ) Notice: Subject to any disclaimer, the term of this patent is extended or adjusted under 35 U.S.C. 154(b) by 0 days.

(21) Appl. No.: 09/358,030

(22) Filed: Jul. 21, 1999

(51) Int. Cl.[7] .................................................. E02B 7/20
(52) U.S. Cl. ............................................ 405/115; 405/91
(58) Field of Search .................................. 405/15, 16, 21, 405/22, 28, 35, 107, 108, 109, 91, 111, 114, 115; 404/6, 10, 13

(56) References Cited

U.S. PATENT DOCUMENTS

| | | | |
|---|---|---|---|
| Re. 34,691 | * 8/1994 | White ........................................ | 404/6 |
| 4,692,060 | 9/1987 | Jackson . | |
| 4,921,373 | * 5/1990 | Coffey ...................................... | 405/115 |
| 4,981,392 | * 1/1991 | Taylor ...................................... | 405/115 |
| 5,040,919 | * 8/1991 | Hendrix .................................... | 405/415 |
| 5,124,767 | * 6/1992 | Dooleage ................................. | 405/115 |
| 5,519,901 | * 5/1996 | Friedman ................................. | 4/503 |
| 5,984,577 | * 11/1999 | Strong ...................................... | 405/114 |
| 6,012,872 | * 1/2000 | Perry et al. .............................. | 405/114 |
| 6,022,172 | * 2/2000 | Siyaj ........................................ | 405/110 |

* cited by examiner

Primary Examiner—Robert E. Pezzuto
(74) Attorney, Agent, or Firm—Dorothy S. Morse

(57) ABSTRACT

A system and method for rapid construction of temporary watertight barriers and walls by unskilled labor which comprise stacked tiers of fluid-filled water bag assemblies. Each water bag assembly comprises a rigid outer frame and a rugged, flexible waterproof bag. The outer frame is separable into a top panel having downwardly extending pivotally-attached connection rods and a bottom panel having upwardly extending pivotally-attached connection tubes. When opposed connection rods and tubes are joined and fixed together with quickly applied fasteners, a waterproof bag placed therebetween becomes sandwiched between the top and bottom panels. Two hose connections on each waterproof bag surface provide conveniently accessed fluid introduction and air vent openings for use in draining and filling them. A standard garden hose or water pump may be used to drain or fill the waterproof bags. Reusable panels and waterproof bags may be made from recycled materials and each should be collapsible into a compact configuration for transport and storage. Applications of the present invention can include, but are not limited to, use in the construction of barriers and walls for protection of property against flood waters, temporary shelters, military bunkers, diversion of people and vehicles from temporarily hazardous areas, prevention of soil erosion, and the containment of slow moving hazardous material spills, as well as temporary storage or stockpiling of potable water and other fluids.

20 Claims, 9 Drawing Sheets

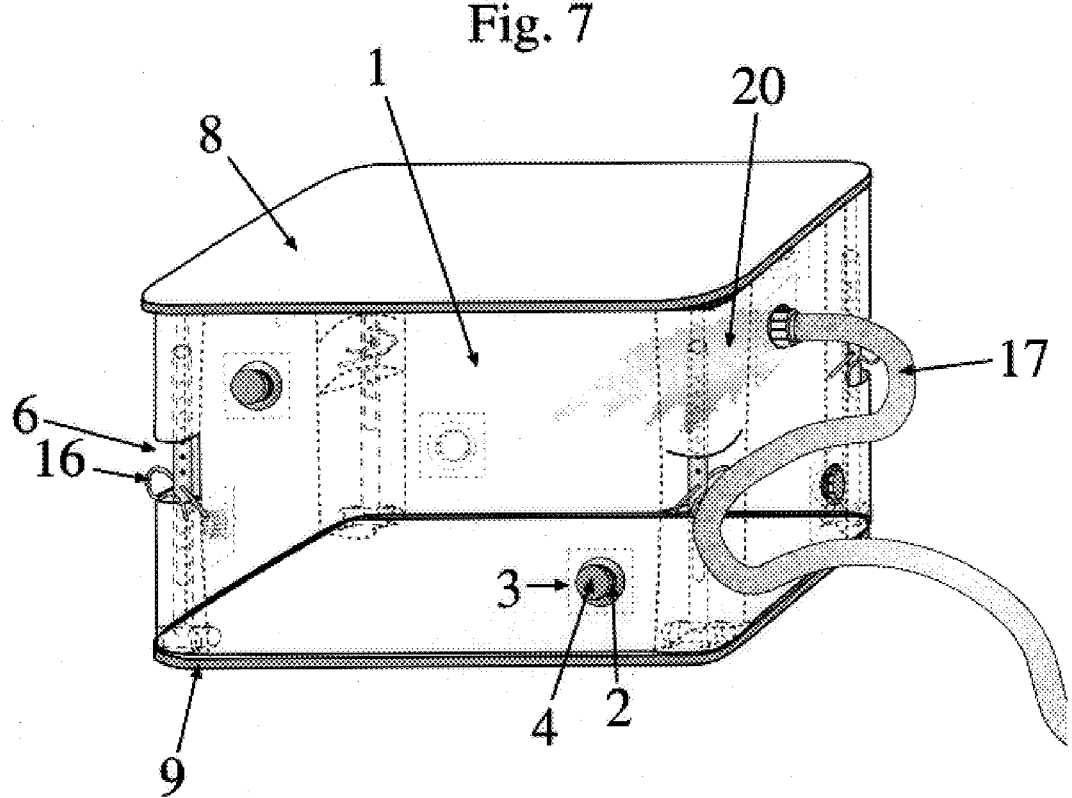

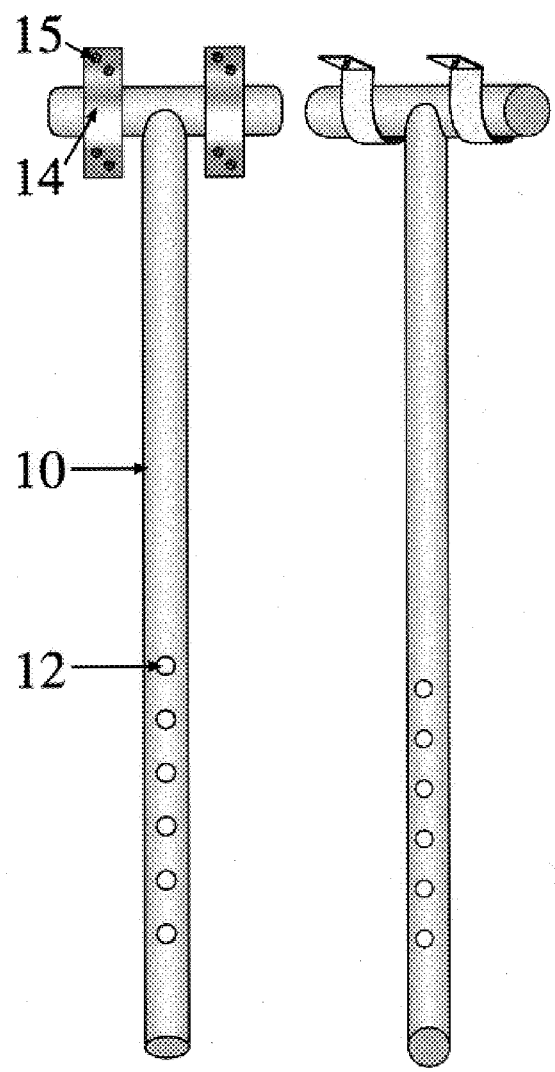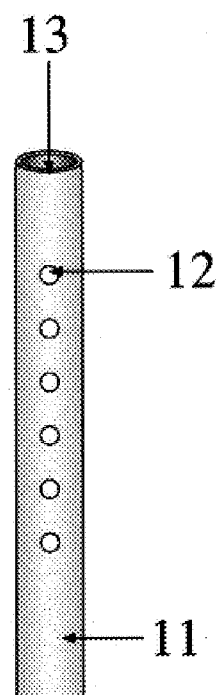
Fig. 8a
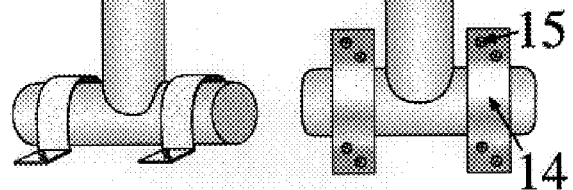
Fig. 8b

MULTI-PURPOSE WATER BAG ASSEMBLY WALL SYSTEM AND METHOD

BACKGROUND

1. Field of Invention

The present invention relates to temporary barriers such as the type of barrier used for protection against rising flood water which can be rapidly constructed by unskilled labor with little or no training, specifically to a method and multi-purpose temporary wall system easily constructed from a plurality of water bag assemblies that are filled with water or any other non-flammable fluid readily available at a targeted wall construction site. The fluid must have a positive pressure flow or be suitable for pumping into the waterproof bag units as they are stacked along with their protective panels to form watertight walls of varying height. Each water bag assembly has a two-part rigid outer frame that is separable into a top panel with downwardly extending pivotally-attached connection rods and a bottom panel with upwardly extending pivotally-attached connection tubes, as well as a rugged, flexible waterproof bag unit that becomes secured tightly between the two panels during use when opposed connection rods and tubes are joined together and fixed in position relative to one another with locking pins or other quickly applied fasteners. It is contemplated for the reusable panels and waterproof bag units to each be collapsible into a compact configuration for transport and storage. It is also contemplated for the panels and bag units to be made from a variety of materials, including bulletproof materials and recycled materials, such as recycled plastic. Applications of the present invention can include, but are not limited to, use in the construction of barriers and walls for the protection of property against rising flood waters, temporary shelters, military bunkers, traffic diversion in road construction zones, prevention of soil erosion, restriction of public access to temporarily hazardous areas, and the containment of hazardous spill materials, as well as the temporary stockpiling of surplus fluids such as use in areas subject to severe storms or other predictable natural disasters, including hurricanes and typhoons, where the water bag assemblies can be filled beforehand with potable water and stacked in tiers for central distribution should drinking water supplies become disrupted, after which the empty water bag assemblies can be re-filled with non-potable water or other readily available fluid and used for the construction of walls for temporary shelters, as well as the construction of protective barriers to prevent public access to areas made temporarily hazardous by the natural disaster.

2. Description of Prior Art

Quickly constructed temporary barriers and walls are needed for many purposes. They can be used to divert or block water accumulation experienced during exceptionally heavy rain storms, when rivers overflow their banks, and during storm surges resulting from hurricanes and typhoons. Quickly constructed emergency shelters can also be needed after a damaging storm to protect people, equipment, and supplies. In addition, temporary barriers are also needed in response to hazardous material spills, such as fuel oil spills that threaten a coastline and its wildlife, as well as to divert people and vehicles away from temporarily hazardous areas. Such barriers need to be sturdily constructed, waterproof, able to withstand exposure to sunlight for extended periods of time without deterioration, easily constructed by unskilled labor, and constructed with a minimum number of tools.

When threatened by flood water, homeowners and municipalities are known to rely on sand bags to divert or block water flow. The material cost for the bags and sand, or other material needed to fill them, is relatively low. Also, sand bags can be used to construct a sturdy barrier or wall with little instruction and few tools. However, the manpower requirement for sand bag use is high. Filling sand bags and transporting each to the location where it will be used is a labor intensive task involving endurance and strength. Also, the low cost sand bags commonly used are not waterproof and require a fill material that will not dissolve when exposed to water. Further, non-dissolvable fill materials must have a sufficiently large particle size so that they will not easily wash through the sand bag fabric during use. Soil at a barrier or wall construction site having a high silt or clay content would be unsuitable as a fill material. Therefore, the cost and timing of importing sand to a barrier or wall construction site needs to be considered. The availability of sand, or other suitable sand bag fill material, at the time of need is also an issue. Municipalities may store some sand in anticipation of a predicted need, however homeowners rarely do, and the amount of sand stored in advance may not be adequate to satisfy all needs. Therefore, the use of sand bags as a defense against flood water is often limited by many factors, including the unavailability of an adequate number of bags, an adequate amount of sand or other appropriate fill material, and/or sufficient manpower to fill and transport all of the sand bags to a barrier or wall construction site. A further disadvantage to sand bag use is that the disposal of sand bags requires a labor intensive effort roughly equivalent to filling them. In addition, since it is a labor intensive task, building a sand bag wall or barrier may not be practical if little advance warning is available before flood waters arrive. Although sand bags are often discarded after use, if stored for reuse they would first need to be emptied and allowed to dry. Cleaning prior to storage would be necessary where sand bags had been exposed to odor-producing sediments. Also, finding a place to dispose of surplus sand or other fill material may present a challenge, since fill material disposal at the flood site may be inappropriate and disposal elsewhere is likely to involve a significant amount of labor and transportation expense.

In contrast, the present invention overcomes nearly all of the disadvantages inherent in sand bag use. For example, since the water bag assemblies of the present invention can use water or any non-flammable fluid which can be pumped through its hose connections, fill material is usually readily available at a barrier or wall construction site. Also, use of the water bag assemblies is less physically demanding than sand bag use since the water bag assemblies are filled with fluid after being placed into their usable positions. Further, the waterproof bag units of the present invention have less impact on the environment during disassembly and disposal, since they are more easily cleaned for reuse, preferably filled with water, and can be made at least in part from recyclable materials. When ready for use, each water bag assembly of the present invention has a substantially rectangular rigid outer frame and a rugged flexible waterproof bag unit positioned therein. The outer frame is readily separable into two parts, each of which can be flattened for efficient transport or storage. The waterproof bag unit can also be separated from the outer frame and collapsed between uses for compact storage. To make each outer frame lighter in weight for easier handling and allow watertight contact laterally between adjacent waterproof bag units within each row in a barrier or wall, vertically extending rods and tubes connect a top panel and a bottom panel to one another. The connection tubes and rods also are each inserted into sleeves attached to the outside surface of the waterproof bag unit to secure it in an optimum usable position. Watertight barriers and walls are made from the present invention by placing water bag assemblies in contact with one another in both rows and tiers. Watertight connection within a tier is provided by each waterproof bag unit in its optimum usable position extending slightly beyond the vertically oriented connection tubes, while watertight connection between tiers is provided by the top and bottom panels being made from a gripping, shear-resistant material, such as plastic or rubber.

In the most preferred method of using the present invention for barrier or wall construction, the bottom panels for a first row of water bag assemblies are positioned in lateral contact with one another in front of the property or unsafe area needing protection. Bottom panel orientation within the rows and tiers is not critical as long as it is uniform so as to provide a watertight configuration. One empty, collapsed or partially collapsed, waterproof bag unit with a vertically extending sleeve at least on each corner interface between its side surfaces is then secured to each bottom panel through insertion of connection tubes pivotally attached to the bottom panel through the vertically extending sleeves. To minimize handling during assembly, the waterproof bag units would have a symmetrical configuration with two hose connections each on its top and bottom surfaces, as well as two hose connections on each of its side surfaces. The introduction of fluid fill material from a positive pressure source, or through use of a pump, would cause the waterproof bag units to become expanded into their usable substantially rectangular configurations. Fill material for the waterproof bag units of the present invention can comprise any non-flammable fluid readily available at a barrier or wall construction site, to include but not be limited to water from diverse sources such as municipal water supplies, lakes, rivers, creeks, and ponds, as well as salt water, and flood water. During fluid introduction, one of the two hose connection openings on the top surface of each waterproof bag unit would be used as a fill opening and the other top surface hose connection opening would be used as an air vent. After filling, hose connections would be capped. A top panel would then be placed centrally over the waterproof bag unit and lowered to allow connection rods pivotally connected to the top panel to each become inserted into an opposed vertically extending connection tube, previously positioned within one of the waterproof bag unit sleeves. Central cutouts in the waterproof bag unit sleeves expose several spaced-apart holes in the distal ends of the rigid connection tubes and rods to which a quickly applied fastener can be attached to fix one in a stationary position relative to the other. The spaced-apart holes in the connection rods and tubes allow top panel adjustment so that top and bottom panels are held in watertight contact with the waterproof bag unit sandwiched therebetween. In the alternative and preferred for some applications, the water bag assemblies of the present invention can be constructed prior to placement in rows and tiers. Since the top panel would then block the two hose connections in the top surface of the water bag units, each waterproof bag unit would be filled through one of its side hose connections. However, to achieve a watertight seal between each waterproof bag unit and its connected top and bottom panels, release and reattachment of the quickly applied fasteners used to secure the connection rods and tubes to one another may be required after filling to allow the top panel to be repositioned relative to its associated waterproof bag unit. When side hose connections are used to fill the waterproof bag units, an upper hose connection on any of its side surfaces may be used as an air vent. As a matter of convenience, alternative filling methods could be used in the construction of a single barrier or wall from the present invention, with the method of filling waterproof bag units prior to top panel assembly being used in lower tiers and the method of top panel assembly prior to filling being used in harder to access upper tiers. Thus, flood containing barriers made from the present invention could be readily placed in strategic locations around homes, businesses, or other threatened structures to help keep flood waters at a safe distance to prevent interior damage. When flood waters are flowing with force in the direction of a structure needing protection, two or more adjacent barriers made of water bag assemblies may be required between the flood water and the structure to divert the flood water around it.

Other advantages of the waterproof bag units of the present invention over the use of sand bags include the practicality of a single person of ordinary strength and endurance being able to assemble and position them to form a barrier or wall. Filling the waterproof bag units of the present invention can also be accomplished through use of a garden hose connected to a municipal water source or a water pump drawing water from a nearby pond, swimming pool, lake, creek, or river, the ocean, or the flood water itself. Openings on all sides of each waterproof bag unit make its top and bottom interchangeable and enhance the speed of barrier assembly. Further, should cost effective storage space be unavailable, or the need for temporary barriers made from the present invention not foreseen as a recurring one, if the waterproof bag units and outer frames are made from recyclable materials as intended in the most preferred embodiment, the present invention can be easily disposed of through commonly available recycling facilities instead of being added to a landfill. If flood water is used to fill the collapsible waterproof bag units and rinsing is needed prior to storage, this can be easily accomplished. Drainage and drying of the collapsible waterproof bag units after use would be facilitated by their many hose connection openings. The waterproof bag units can be made from many different materials, as long as they remain flexible and sufficiently rugged to be puncture-resistant during assembly and use. If the waterproof bag units and outer frames are made from bulletproof materials, they could also be used to construct temporary shelters or bunkers for military personnel. For road construction use, at a minimum the waterproof bag units and outer frames would be made from both UV-resistant materials and materials having reflective properties so that they are readily visible in reduced light conditions. In contrast, it is important for waterproof bag units employed in coastal areas to be made from saltwater-resistant materials. Also, waterproof bag units used under unusually hot or cold temperature conditions should be made from materials that are temperature tolerant so that they do not become prematurely brittle.

The prior art thought to be the closest in concept to the present invention is the invention disclosed in U.S. Pat. No. 4,692,060 to Jackson (1987), however, the present invention is distinguishable from the Jackson invention in many important ways. The Jackson invention comprises elongated water-fillable tubes each having the cross-sectional configuration of an equilateral triangle. They are placed end-to-end when used to form elongated dams or dikes. A plurality of longitudinally spaced-apart and vertically extending rigid lateral supports are attached to the sides of each elongated tube to form multiple inverted V-shaped structures. Rigid longitudinal supports are attached to Jackson tube at its apex between the lateral supports. A single hole through the upper end of each lateral support allows connection of opposed lateral supports to one another to form the shape of a "V", and also connection of lateral and longitudinal supports. It is also contemplated for the Jackson invention to have a means for connecting the lower ends of adjacent lateral supports. Each Jackson tube has a water inlet centrally located near the apex on one of its sides and a water outlet on one of its ends centrally near the bottom of the tube. A two-tiered Jackson barrier would have a bottom tier made from three tubes, with the center tube being placed in an inverted position between the lateral supports of two adjacent upright tubes. A fourth tube alone would comprise the upper tier and would be placed in an upright position upon the flat top surface of the inverted center tube. Thus the two-tiered triangular barrier would have twice the height of a single-tier Jackson barrier. It is contemplated for the lower ends of the lateral supports for the fourth tube in the second tier to be connected to the upper ends of the lateral supports for the upright tubes in the bottom tier.

The present invention is similar to the Jackson invention by providing a flexible water-fillable container secured to a rigid outer frame. Also, both inventions are stackable and have sealable openings for adding and draining fluids therefrom. However, that is where the similarities end. In contrast to the Jackson invention, the present invention has smaller fillable waterproof bag units and a simpler frame construction for enhanced ease of handling by unskilled people. For most purposes the water bag assemblies of the present invention would not have to be interconnected as do adjacent lateral supports of the Jackson invention. As a result, damaged sections of a barrier made from the present invention would be more easily replaced than in a dike made from the Jackson invention. Also, the multiple openings on each of its sides allow the waterproof bag units of the present invention to be more quickly and easily drained than the Jackson tubes which only have lower drain holes on its ends. Thus either a pump would be required to drain each Jackson tube from the side hole near the apex, or a first Jackson tube in a dike would have to be drained through the hole positioned near the bottom edge of its end panel, and then moved away from the end panel of the adjacent tube before access could be gained to the end drain hole of the next adjacent tube to empty and disassemble it.

The present invention is further distinguished from the Jackson invention in that it can be used in more diverse applications. The smaller size and less cumbersome handling of the water bag assemblies of the present invention would allow for more convenient construction of barriers and walls having different height dimensions than could be made from the Jackson invention. Also, barriers made from the present invention for road construction use could be more quickly relocated to a new area of construction than a barrier made with the Jackson invention. Further, the footprint of a barrier or wall made from the present invention is much smaller than that of the Jackson invention, particularly for multiple-tier barriers or dikes, which could be an advantage in many applications, including the efficient storage of surplus fluids. The pivoting connection rods and tubes attached to the flat top and bottom panels, respectively, as well as the quickly attached and released fasteners used to secure the connection rods and tubes to one another, also help to distinguish the present invention from the Jackson invention. In addition, the smaller size of the waterproof bag units of the present invention would make them more cost effective to manufacture than the larger Jackson tubes, and result in the present invention being more affordable for homeowner use. Fluid-fillable barrier systems other than the Jackson invention are also known, however none have a configuration similar to the present invention nor all of its advantages.

SUMMARY OF INVENTION—OBJECTS AND ADVANTAGES

The primary object of the present invention is to provide a multiple purpose temporary wall system that can be easily set up by a limited number of people and resources in a short amount of time. A further object of the present invention is to provide a reusable temporary wall system that can be easily disassembled and compactly stored when not in use with little refurbishment between uses. It is also an object of the present invention to provide a temporary wall system that can be easily set up by adults of ordinary strength, endurance, and skill with no special training and a minimum number of tools. A further object of the present invention is to provide a temporary wall system with easily stackable units that can form watertight barriers of differing height. Another object of the present invention is to provide a temporary wall system that is made from rugged yet lightweight materials for easy handling. A further object of the present invention is to provide a temporary wall system that can use any source of non-flammable fluid to inflate its waterproof bag units, such as water from municipal sources, swimming pools, ponds, lakes, creeks, and rivers, as well as salt water and storm created flood water. It is also an object of the present invention to provide a temporary wall system that is affordable for use by both homeowners and municipalities. It is also an object of the present invention to provide a temporary wall system wherein both manufacture and use have minimal adverse environmental impact.

As described herein, properly manufactured and used, the present invention would provide a barrier or wall system comprising a plurality of substantially rectangular water bag assemblies positioned adjacent to one another and stackable in multiple tiers to construct watertight barriers and walls of differing height. Since each water bag assembly would comprise a separable two-part rigid outer frame and a rugged, collapsible waterproof bag unit secured therein with quickly applied fasteners, such as locking pins or locking clips, barriers and walls made from the present invention would be easy to construct by one or two untrained adults of ordinary skill having access to a garden hose or water pump without the use of any hand tools. The fasteners would be easily attachable and releasable so that a barrier or wall made from the present invention could be promptly assembled and then easily disassembled in a short period of time when it is no longer needed or must be moved to a new location. Ease of handling is facilitated by the waterproof bag units having a conveniently manipulated size, their manufacture being from lightweight materials such as plastic, and the ability of the waterproof bag units and outer frame panels to be stored in collapsed configurations so that several can be simultaneously hand-carried by one person from a delivery vehicle or storage site to the construction site of the barrier or wall without undue effort. The essentially rectangular configuration of the water bag assemblies allows stable temporary barriers or walls of differing height to be rapidly built with minimal alignment effort being required between successive tiers. The use of waterproof bags units with threaded hose connections on all of its sides makes the top and bottom surfaces interchangeable to further minimize handling and enhance speed of construction. The water bag assemblies of the present invention can use non-flammable fluid from any readily available source as a fill material, to include but not be limited to water from municipal sources, swimming pools, rivers, lakes, ponds, and creeks, as well as salt water, and flood water, therefore pre-need storage of fill material such as sand becomes unnecessary. As a result, the present invention is convenient for use by homeowners as well as municipalities. Also, since the waterproof bag units of the present invention have few parts, they can be cost effectively manufactured so as to be affordable for widespread homeowner use. Barriers and walls made from the present invention are also watertight since the perimeter dimensions of the top and bottom panels of its outer frames allow the sides of adjacent waterproof bag units to touch one another during use. Also contributing to the watertight structure of barriers walls having multiple tiers are the flat configurations, non-slipping surface textures, and/or gripping adhesion of the materials used to make the top and bottom panels, such as plastic or rubber, which allow adjacent panels in different tiers to securely hold against one another when subjected to shearing forces.

Adults of ordinary strength and endurance can readily construct and disassemble barriers or walls made from the present invention since its waterproof bag units are set into place before filling and do not have to be lifted again until they are drained of fluid. The time for barrier and wall construction is also reduced since the additional step of connecting adjacent outer frames is unnecessary for most purposes due to the stability of the completed tiers provided by the weight of the fluid in the waterproof bag units, the rigidity of the outer frame, and the affinity of adjacent flat surfaces of outer frame panels to grip one another and resist shearing forces,. However, if interconnection between water bag assemblies in the same row, different tiers, or even in adjacent barriers or walls is desired or dictated by a particular need, attachment between water bag assemblies can be easily and quickly accomplished through the unused adjustment holes in the connection rods and tubes that are exposed in the sleeve cutout centrally located on the vertical corner interface of each waterproof bag unit. Labor expense is also reduced by use of the present invention since handling of the water bag assemblies after use is minimized. In most instances the waterproof bag units of the present invention can be reused with little refurbishment other than a cursory rinsing. A separate drying step after rinsing is not required since interior drying of the waterproof bag units is facilitated by the presence of multiple hose connection openings on each of its flat surfaces which can remain unsealed during storage. When hose connections on opposite sides of the stored waterproof bag units are left uncapped, drying will eventually occur without intervention. Also, use of the present invention has a low environmental impact since for most applications its water bag assemblies are intended for reuse and/or recycling. In the most preferred embodiment both waterproof bag units and outer frame panels would comprise UV-resistant materials and/or other substances making them resistant to the deteriorating effects of extended exposure to sunlight. Also, prior to dismantling a barrier made from the present invention, fluid in the waterproof bag units would preferably be returned to its source, or when water is used, the water could be released into and allowed to evaporate within any nearby storm water retention area with a current water level below its maximum holding capacity. Further, in situations where cost efficient storage space is not available for the present invention after use, since it is contemplated for its waterproof bag units and outer frames to be made from recyclable materials where appropriate to the intended application, surplus waterproof bag units and outer frames could be sent to a recycling facility instead of a landfill.

No special training is required to assemble the outer frames of the present invention. The rigid outer frame of the most preferred embodiment comprises four hinged connection tubes attached to the four corners of a rectangular bottom panel which are extended to an approximately perpendicular orientation prior to use and four hinged connection rods attached to the four corners of a rectangular top panel which are also extended to an approximately perpendicular orientation prior to use. One bottom panel is first positioned on a solid surface with its connection tubes extending in an upward direction. One collapsed waterproof bag unit is placed over the bottom panel and lowered so that the extended connection tubes become inserted through vertically oriented sleeves on the corners of the waterproof bag unit. Two hose connections on the top surface of the waterproof bag unit are then unsealed, one for use as a fill opening and the other for use as an air vent. The hose connection selected as a fill opening is then connected to a common garden hose or a pump and non-flammable fluid is introduced into the waterproof bag unit to cause it to fully expand into its usable substantially rectangular configuration which substantially fills the volume defined by the connection tubes. After the fill opening and air vent are sealed, the top panel is positioned over the waterproof bag unit with connection rods extending in a downward direction. The top panel is lowered so that each connection rod becomes inserted into an opposed connection tube, the top and bottom panels become positioned substantially parallel to one another, and the top and bottom panels respectively become positioned in full contact with the upper and lower surfaces of the waterproof bag unit. One quickly attached fastener is then inserted through holes in each paired connection tube and rod to keep the top and bottom panels in watertight contact with the upper and lower surfaces of the waterproof bag unit positioned between them during use. The connection rods and tubes are designed to pivot for convenient storage before use and for easy transport. When fully assembled, multiple water bag assemblies positioned and stacked in successive tiers form a temporary watertight barrier or wall useful for a variety of purposes with low material expense and limited available resources. They can be used by homeowners and municipalities to protect residences, commercial buildings, and other structures threatened by flood damage. Once a threat of flooding is over, each water bag assembly can be drained, fully disassembled, and collapsed with minimal effort for compact storage and with little or no refurbishment prior to the next use. The water bag assemblies can also be used to build walls for temporary shelters, barriers to restrict public access to temporarily hazardous areas, barriers to contain hazardous spill materials, and as containers for the temporary storage of potable water and other fluids. It is anticipated that only new, or carefully cleaned and sanitized, waterproof bag units would be used for the storage of potable water. If made from materials with reflective properties, the water bag assemblies can also be used to make barriers for the diversion of traffic in road construction areas, and when made from bulletproof materials the water bag assemblies can be used by the military for bunkers and other shelter needs. The design of the water bag assemblies is purposefully simple for cost effect manufacture and use.

The description herein provides the preferred embodiment of the present invention but should not be construed as limiting the scope of the multi-purpose temporary barrier system. For example, variations can occur in the overall size of the water bag assemblies; the materials used to construct the outer frames and waterproof bag units; the number of connection tubes and rods used; the number of hose connection openings located through each surface of the waterproof bag units; the size of hose connections used; and the type of quickly attached fasteners used to secure the connection tubes and rods together, other than those shown and described herein, may be incorporated into the present invention. Thus the scope of the present invention should be determined by the appended claims and their legal equivalents, rather than the examples given.

BRIEF DESCRIPTION OF THE DRAWINGS

FIG. 7 is a perspective view of a fully expanded waterproof bag unit of the present invention supported within top and bottom panels, with a standard garden hose attached to one of its threaded water hose connectors for the purpose of filling the waterproof bag unit.

FIG. 8a consists of two perspective views of a preferred embodiment of the connection rods and associated hinges of the present invention used to secure connection rods to the top panel, the left view showing the rod in a collapsed configuration as it would appear against the top panel and the right view showing the rod in an extended configuration.

FIG. 8b consists of two perspective views of a preferred embodiment of the connection tubes and associated hinges of the present invention used to secure connection tubes to the bottom panel, the left view showing the tube in an extended configuration and the right view showing the tube in a collapsed configuration as it would appear against the bottom panel.

DETAILED DESCRIPTION OF PREFERRED EMBODIMENTS

Figure 6A:
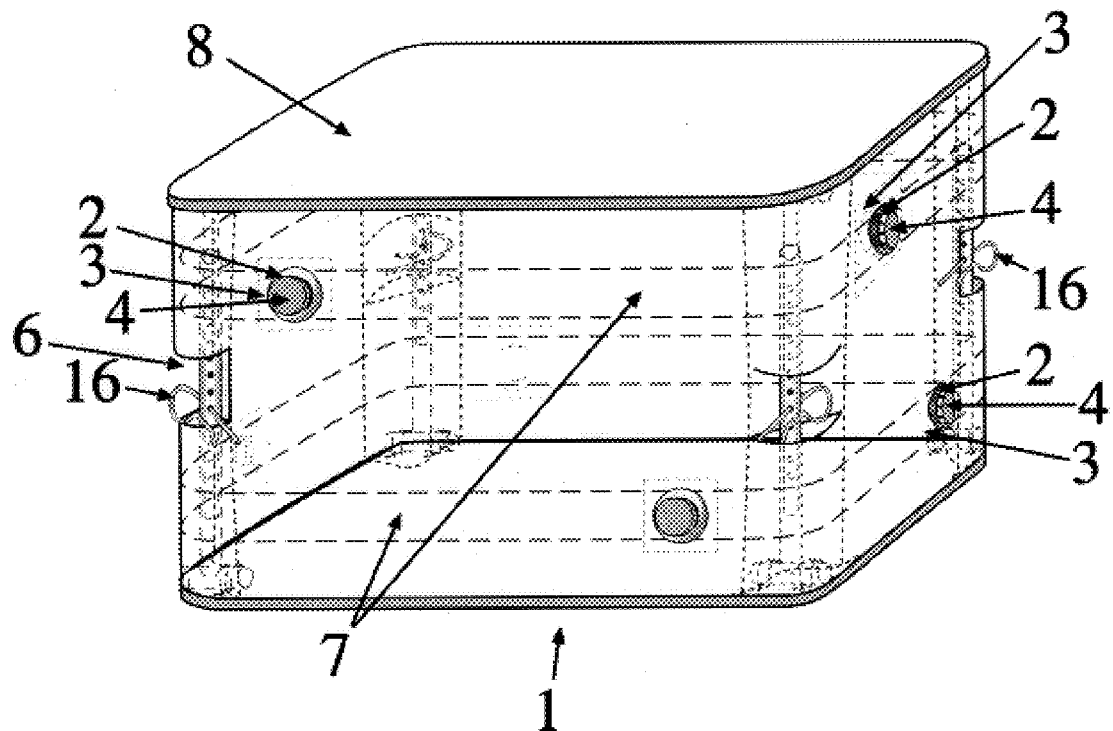
FIG. 6a is a perspective view of two side surfaces of a fully expanded waterproof bag unit of the present invention with the top panel and the bottom panel in contact with the upper and lower surfaces of the waterproof bag unit respectively, the threaded hose connectors on the side surfaces being sealed, and a locking pin exposed through each cutout in the vertically extending waterproof bag unit sleeves on the corners of the water bag, the waterproof bag unit also having horizontally extending reinforcement bands therearound.
Figure 6B:
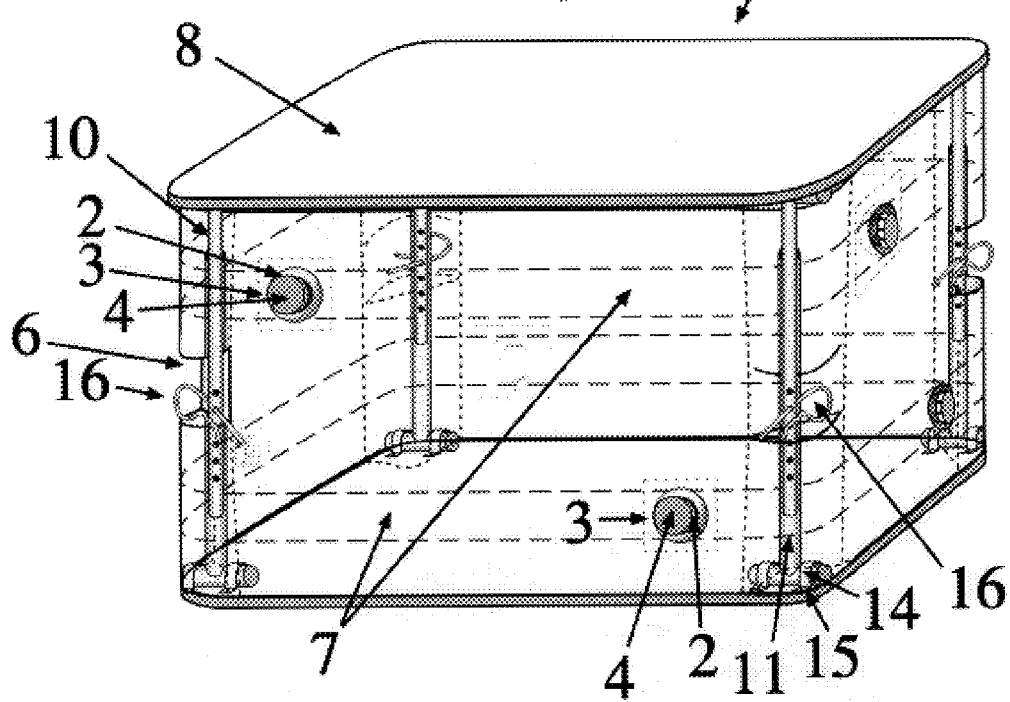
FIG. 6b is a perspective view of a fully expanded waterproof bag unit of the present invention with horizontally extending reinforcement bands and showing the connection rods and connection tubes as they would look inside of the vertically extending waterproof bag unit sleeves, the threaded hose connectors on the side surfaces being sealed, and locking pins centrally securing opposed connection rods and tubes together so as to hold the top and bottom panels flush against the upper and lower flat surfaces of the expanded waterproof bag unit in a watertight configuration.

The preferred embodiment of the present invention, as shown in FIGS. 6a, 6b, and 7, includes a plurality of water bag assemblies each made from a rugged flexible substantially rectangular waterproof bag 1 and a substantially rectangular rigid outer frame. The outer frame is assembled from a top panel 8 having four hinged elongated connection rods 10 downwardly depending therefrom near to its corners although more than four connection rods 10 are possible; a bottom panel 9 having four hinged elongated connection tubes 11 upwardly depending therefrom near to its corners although more than four connection tubes 11 are also contemplated; and one quickly attached locking pin or clip 16 for fixing each pair of opposed connection rods 10 and connection tubes 11 to one another. In the preferred embodiment of the present invention the number of connection rods 10 and connection tubes 11 is identical. When stacked in tiers to form a watertight barrier or wall, the water bag assemblies of the present invention can provide protection against rising flood water (not shown) and be used for many other purposes, including but not limited to the construction of walls for temporary shelters and military bunkers, barriers for the diversion of people and vehicles from temporarily hazardous areas, and barriers for the prevention of soil erosion and the containment of hazardous spill materials, as well as for the consolidated temporary storage of potable water and other fluids. The present invention has an advantage over sand bags (not shown) in being able to use any fluid readily available at a barrier or wall construction site, including flood water, as a source of fill material; its disassembly and disposal have less environmental impact; and its use is not as labor intensive.

Figure 1A:
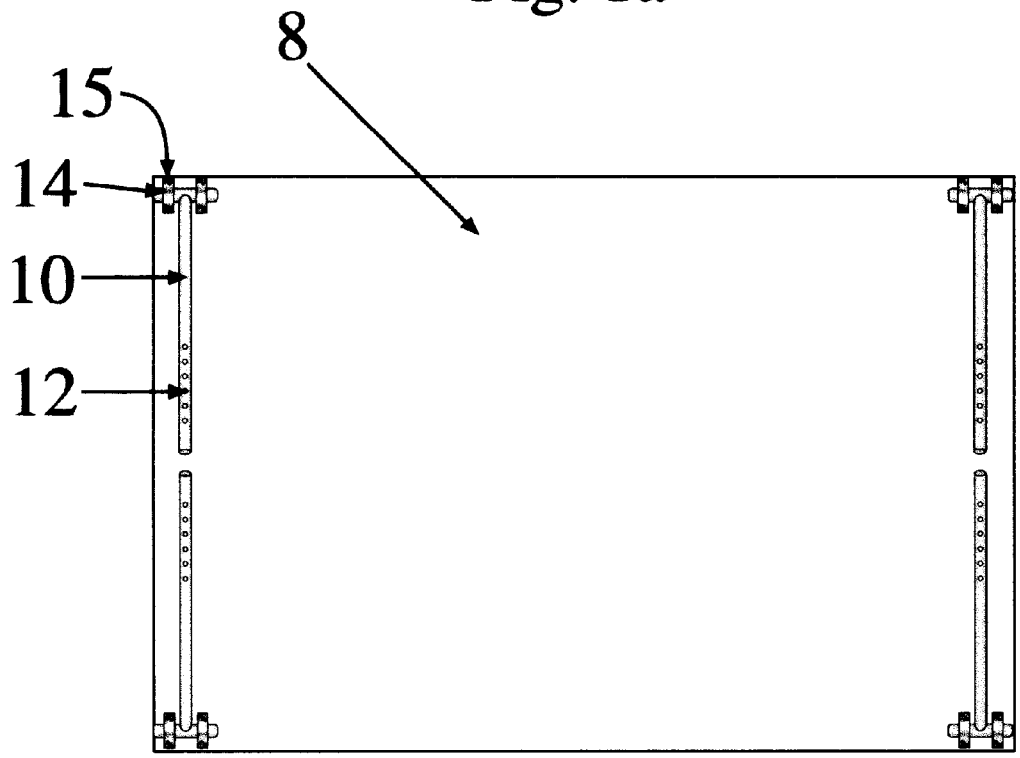
FIG. 1a is a bottom view of a preferred embodiment of the top panel of the present invention with its four hinged connection rods attached near to the four corners of the underside surface of the top panel and retracted for compact storage or transport.

FIG. 1a shows a preferred embodiment of top panel 8 having four T-shaped connection rods 10 attached near to the four corners of its underside surface and retracted for compact storage or transport of top panel 8 to a barrier or wall construction site. The T-shaped configuration of each connection rod 10 shown in FIG. 1 a comprises the central portion of one cylindrical shorter member depending from one end of a cylindrical straight-walled longer member in perpendicular orientation. The shorter members of each connection rod 10 are secured to top panel 8 and used to movably attach connection rods 10 to top panel 8. The circular cross-sectional configuration of connection rods 10 shown in FIG. 1a is not critical to the present invention and it is equally contemplated for connection rods 10 to have other cross-sectional configurations as preferred or found suitable to a particular application, such as but not limited to that of a triangle, square, pentagon, hexagon, or octagon. The attachment of the shorted members of connection rods 10 must be near to the perimeter of top panel 8 to allow sufficient volume therebetween to properly support waterproof bag 1, shown in FIG. 4a, in an optimum position for watertight wall or barrier construction. A minimum of four connection rods 10 is needed to support top panel 8, and preferably at least one connection rod 10 would be positioned near to each of the four corners of top panel 8, as shown in FIG. 1a. If the number of connection rods 10 does exceed four, it is preferred that the additional connection rods 10 be added in pairs and evenly spaced between the four connection rods 10 shown in FIG. 1a to provide uniform support to waterproof bags 1.

Although the connection rods 10 shown in FIG. 1a are each secured to top panel 8 with one hinge 14 and eight screws 15, the number of hinges 14 and screws 15 used is not critical. FIG. 1a shows each hinge 14 being made from a thin U-shaped strip having an arcuate center portion with opposed lateral flanges. The dimension of the arcuate portion of hinges 14 closely approximates that of the shorter members of connection rods 10 and FIG. 1a further shows each hinge 14 being attached to top panel 8 in a position close to the longer member of its associated connecting rod 10. However, use of the simple hinge 14 shown in FIG. 1a which allows free 180° movement of connection rods 10 relative to top panel 8 without stops is not critical and it is considered within the scope of the present invention to have other types of pivotal fastening devices between top panel 8 and each connection rod 10 as long as each substitute fastening device (not shown) would allow its associated connection rod 10 to be movable between the fully retracted position shown in FIG. 1a and the fully extended position shown in FIG. 3a. FIG. 1a also shows connection rods 10 each having six spaced-apart holes 12 therein near to its distal end. Although not shown, it is contemplated for connection rods 10 to also have opposed holes 12 on the side hidden from view so that a fixed fastener, such as locking pin or clip 16 shown in FIG. 5, could be attached completely through each connection rod 10 to provide an attachment that is not easily dislodged during use. The number of holes 12 used and the amount of spacing between holes 12 is not critical, but each should be sufficient to allow the adjustment the distance adjustment needed between top panel 8 and bottom panel 9 to achieve a watertight seal with a waterproof bag 1 placed between them.

Figure 1B:
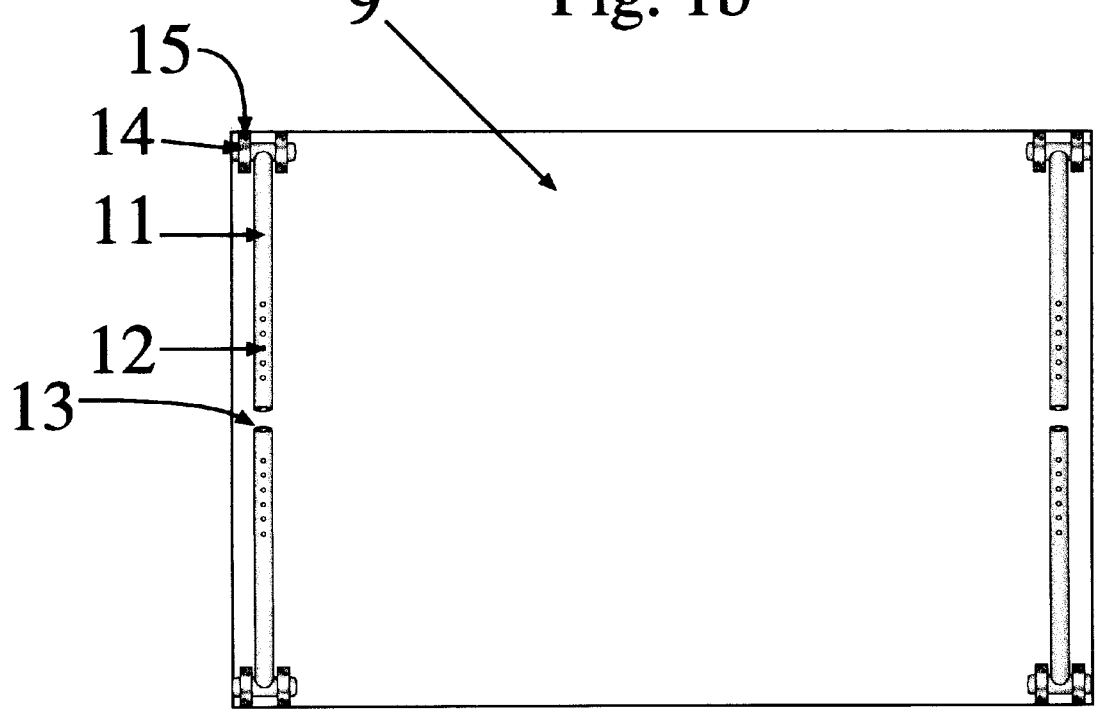
FIG. 1b is a top view of a preferred embodiment of the bottom panel of the present invention with its four hinged connection tubes attached near to the four corners of the bottom panel and retracted for compact storage or transport.

Similarly, FIG. 1b shows a preferred embodiment of bottom panel 9 having four T-shaped connection tubes 11 attached near to the four corners of one of its flat surfaces with hinges 14 and retracted for compact storage or transport to a barrier or wall construction site. The T-shaped configuration of each connection tube 11 consists of the central portion of one cylindrical shorter member depending from one end of a cylindrical straight-walled longer member in a perpendicular orientation. The shorter members of each connection tube 11 are secured to bottom panel 9 and used to movably attach each connection tube 11 to bottom panel 9. The circular cross-sectional configuration of connection tubes 11 is not critical and it is equally contemplated for connection tubes 11 to have other cross-sectional configurations, such as but not limited to that of a triangle, square, pentagon, hexagon, or octagon. However in all embodiments of the present invention the cross-sectional configuration of connection tubes 11 and connection rods 10 must be substantially identical, with the diameter of each connection tube 11 being only slightly larger than that of its paired connection rod 10 so that each connection rod 10 can be securely inserted into its paired connection tube 11 with minimal lateral movement for support of a waterproof bag 1, shown in FIG. 4a, in an optimum position for watertight wall and barrier construction. The number of connection tubes 11 may exceed four and is not critical, however, the number of connection tubes 11 should be identical to the number of connection rods 10 and each connection tube 11 should be attached to bottom panel 9 in a position which allows it to oppose a different one of the connection rods 10 attached to a paired top panel 8. If the number of connection tubes 11 does exceed four, it is preferred that the additional connection tubes 11 be added in pairs and evenly spaced around the perimeter of bottom panel 9 between the four connection tubes 11 shown in FIG. 1a for uniform support of waterproof bag 1.

FIG. 1b also shows connection tubes 11 each being secured to bottom panel 9 with one hinge 14 and eight screws 15, similar to the connection between connection rods 10 and top panel 8 shown in FIG. 1a. The number of hinges 14 and screws 15 used may be varied according to the application and the use of substitute fastening devices (not shown) in place of hinges 14 is contemplated as long as the substitute devices allow connection tubes 11 to fully extend and retract as needed for proper use between the positions shown in FIGS. 3b and 1b, respectively. FIG. 1b also shows connection tubes 11 each having six spaced-apart holes 12 therein near to its distal end. Although not shown, it is contemplated that opposed holes 12 would appear on the hidden side of each connection tube 11 so that a fixed fastener, such as locking pin or clip 16 shown in FIG. 5, could be attached completely through connection tube 11. The number of holes 12 used and the spacing between adjacent holes 12 is not critical but should be sufficient to allow some adjustment in the distance between top panel 8 and bottom panel 9 so that a watertight seal can be achieved when a waterproof bag 1 is placed between them. FIG. 1b further shows each connection tube 11 having a longitudinal bore 13 therethrough. It is contemplated for the inside diameter of bores 13 to be slightly larger than the outside diameter of a paired connection rod 10 so that the distal end and a substantial part of an opposed straight-walled connection rod 10 can become securely positioned within each connection tube 11 with minimal lateral movement.

It is contemplated for top panels 8, bottom panels 9, connection rods 10, and connection tubes 11 to be made from lightweight materials for easy transport, yet materials that are sufficiently strong and rugged to allow connection rods 10 and connection tubes 11 in a bottom tier of a barrier or wall to support the weight of fluid (not shown) in the waterproof bags 1 above them. Top panel 8, bottom panel 9, connection rods 10, and connection tubes 11 can all be made from the same material, or connection rods 10 and connection tubes 11 can be made from materials different from those used to make top panel 8 and bottom panel 9. In the preferred embodiment it is contemplated for top panel 8 and bottom panel 9 to be made from recycled plastic. However, where appropriate to the application, it is also contemplated for top panel 8 and bottom panel 9 to be made from rubber or rubber-like material to enhance the gripping attachment needed between adjacent panel surfaces to create a watertight seal between barrier or wall tiers. Since the present invention is generally contemplated for outdoor use, top panels 8, bottom panels 9, connection rods 10, and connection tubes 11 would be made from waterproof materials. This would also help to minimize refurbishment between uses, as a cursory rinsing generally would suffice. Also, for easy disposition of the present invention after final use with low environmental impact, it is contemplated for top panels 8, bottom panels 9, connection rods 10, and connection tubes 11 in the most preferred embodiment to be made from materials which can be repeatedly recycled, such as plastic. Top panels 8, bottom panels 9, connection rods 10, and connection tubes 11 can also optionally be made from materials having reflective properties, bulletproof materials, materials resistant to the deteriorating effects of ultra-violet radiation, saltwater-resistant materials, materials which do not readily become brittle when repeatedly exposed to wide ranges in temperature, materials of any color and surface decoration to include company logos, and materials which are either transparent, translucent, or opaque. Further, even though not shown in FIGS. 1*a* and 1*b*, top panels 8 and bottom panels 9 may be made from materials containing a gritted substance to provide a non-slip surface texture, or materials having a low-relief three-dimensional gripping surface texture designed to resist shearing forces while maintaining watertight contact between adjacent top panels 8 and bottom panels 9 in successive barrier tiers. The dimensions of connection tubes 11 and connection rods 10 are not critical, however, the outside diameter dimension of connection rods 10 must be smaller than the inside diameter dimension of bores 13 in connection tubes 11. Also, the length and diameter dimensions of connection tubes 11 and connection rods 10 must also be appropriate to the intended height of the barrier or wall they will help to construct. In the preferred embodiment it is contemplated for connection tubes 11 and connection rods 10 to each have a minimum length dimension of approximately four inches, so that at a minimum the height of the water bag assemblies of the present invention would be approximately six inches. Also, the length, width, and depth dimensions of top panels 8 and bottom panels 9 are not critical, however, in the preferred embodiment it is contemplated for the length and width dimensions of each top panel 8 to be identical to the length and width dimensions of an opposed bottom panel 9, and for each top panel 8 and bottom panel 9 to have minimum length and width dimension of approximately ten inches. In the most preferred embodiment top panels 8 and bottom panels 9 would each have a length dimension of approximately fifteen inches and a width dimension of approximately ten inches, a size small enough for easy transport between a storage area or delivery vehicle and a targeted barrier or wall construction site (not shown). When a paired top panel 8 and bottom panel 9 define a space between them having an approximate one cubic foot volume, the waterproof bag 1 supported by it, such as waterproof bag 1 in FIG. 4*a,* would contain approximately seven-and-one-half gallons of fluid weighing close to eighty pounds. In contrast, connected top panels 8 and bottom panels 9 defining a space having an approximate two cubic foot volume, would support a waterproof bag 1 containing approximately fifteen gallons of fluid weighing close to one-hundred-sixty pounds. Although opposing top panels 8 and bottom panels 9 that define a volume larger than two cubic feet are also contemplated for use in the most preferred embodiment, particularly for ease of handling and alignment by homeowners, top panels 8 and bottom panels 9 would probably have dimensions suitable for supporting a waterproof bag 1 having a total volume of two cubic feet or less.

It is also contemplated for water bag assemblies of more than one height to be used in the construction of a single barrier or wall. Top panels 8 and bottom panels 9 having longer connection rods 10 and connection tubes 11, respectively, could be used to construct the bottom tiers of a barrier or wall, with top panels 8 and bottom panels 9 having shorter connection rods 10 and connection tubes 11, respectively, being used to construct higher tiers of the same barrier or wall. Top panels 8 and bottom panels 9 of two different length dimensions would also be required in a wall or barrier having the bottom panels 9 of a next higher tier centered over the interface between top panels 8 in the next lower tier to provide an offset assembly. Such offset assembly is preferred since it would add stability a completed barrier or wall, however, voids in the ends of alternating tiers in a barrier or wall made by this offset type of construction would require the use of shortened top panels 8 and bottom panels 9 having approximately one-half the length dimension of the remaining top panels 8 and bottom panels 9. Although not routinely required and not shown, where suited to a particular application cross attachment means could be used between selected top panels 8 and bottom panels 9 to further strengthen a multiple tier barrier or wall constructed with the present invention. Cross attachment could strengthen a barrier or wall made from offset construction where a high probability of impact against the ends of the barrier or wall is anticipated. Although not shown, it is contemplated that cross attachment could be provided in form of stretchable or non-stretchable cords attached horizontally, vertically, and diagonally between adjacent or spaced-apart waterproof bags 1, such as behind connection tubes 11 in either the central sleeve cutouts 6 in waterproof bags 1 or in a position near to bottom panel 9, behind connection rods 10 in a position near to top panel 8, or through one or more holes 12 in connection tubes 11 that are exposed through selected sleeve cutouts 6.

Figure 2A:
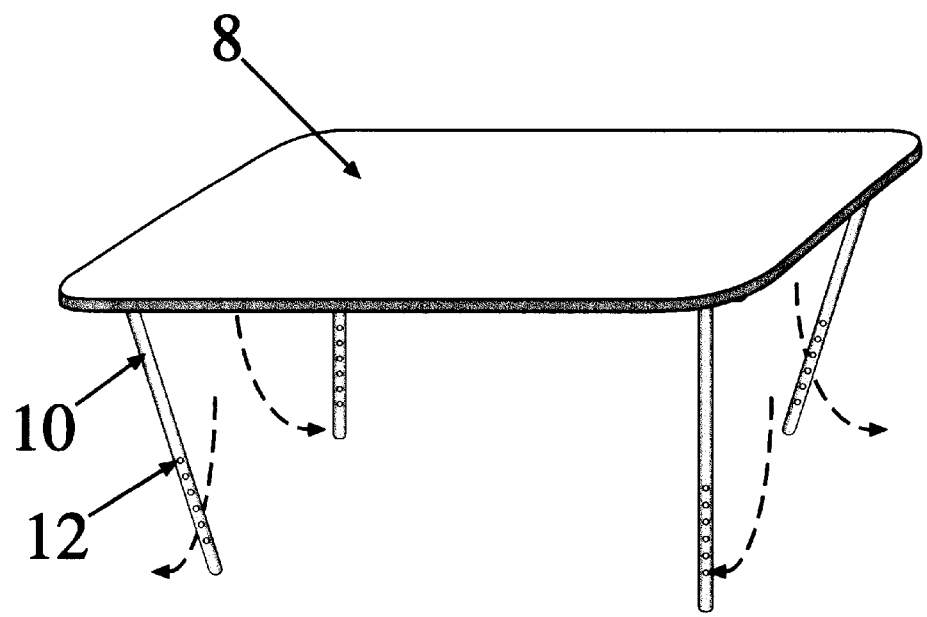
FIG. 2a is a perspective view of the preferred embodiment of the top panel of the present invention with its four hinged connection rods in the process of being extended prior to assembly and arrows indicating the direction of rod movement during extension.
Figure 2B:
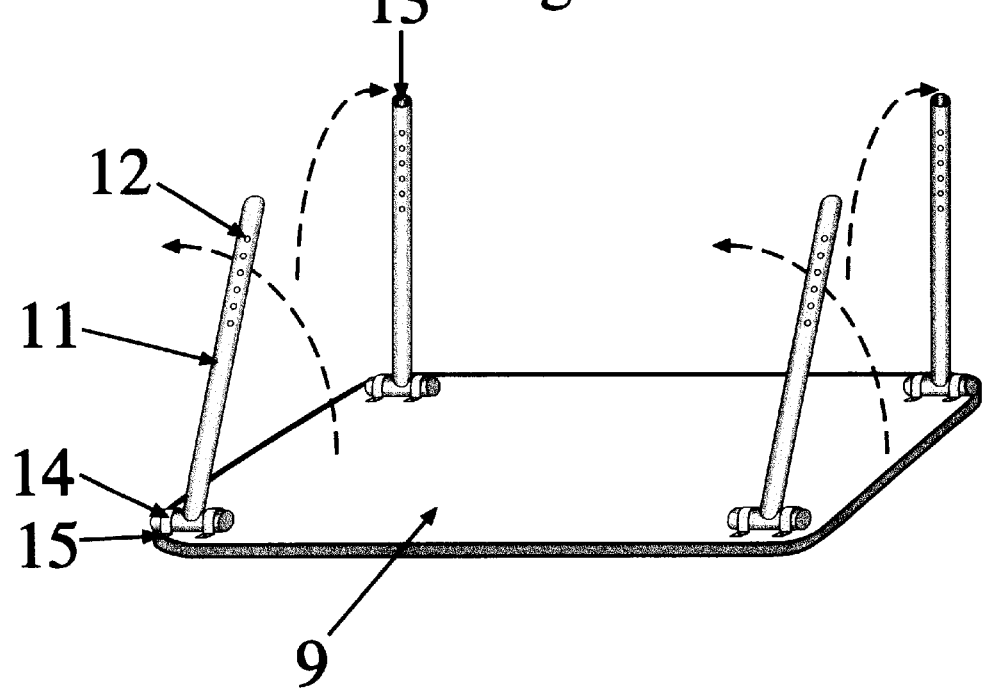
FIG. 2b is a perspective view of the preferred embodiment of the bottom panel of the present invention with its four hinged connection tubes in the process of being extended prior to assembly and arrows indicating the direction of tube movement during extension.
Figure 4A:
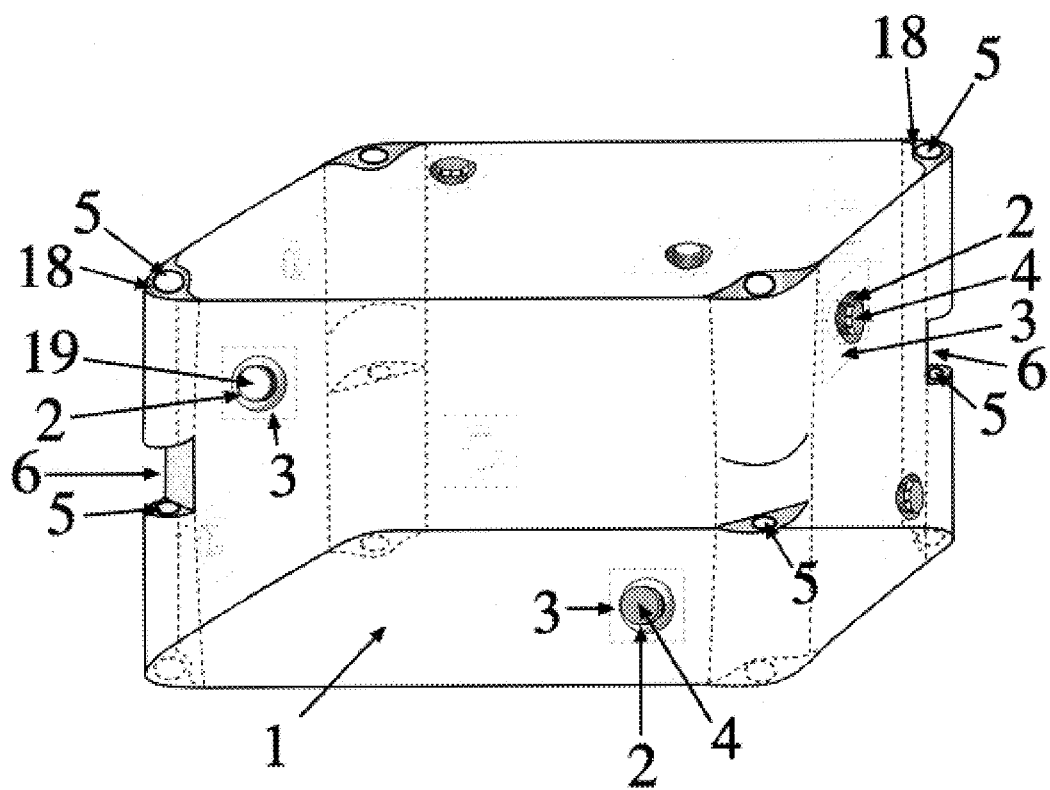
FIG. 4a is a perspective view of a preferred embodiment of a waterproof bag unit of the present invention in an expanded configuration and having two hose connections on each of its sides near to opposite corners, a vertically extending tube retaining sleeve on each of its corners, and a central cutout in each sleeve for locking pin or locking clip connection.
Figure 5:
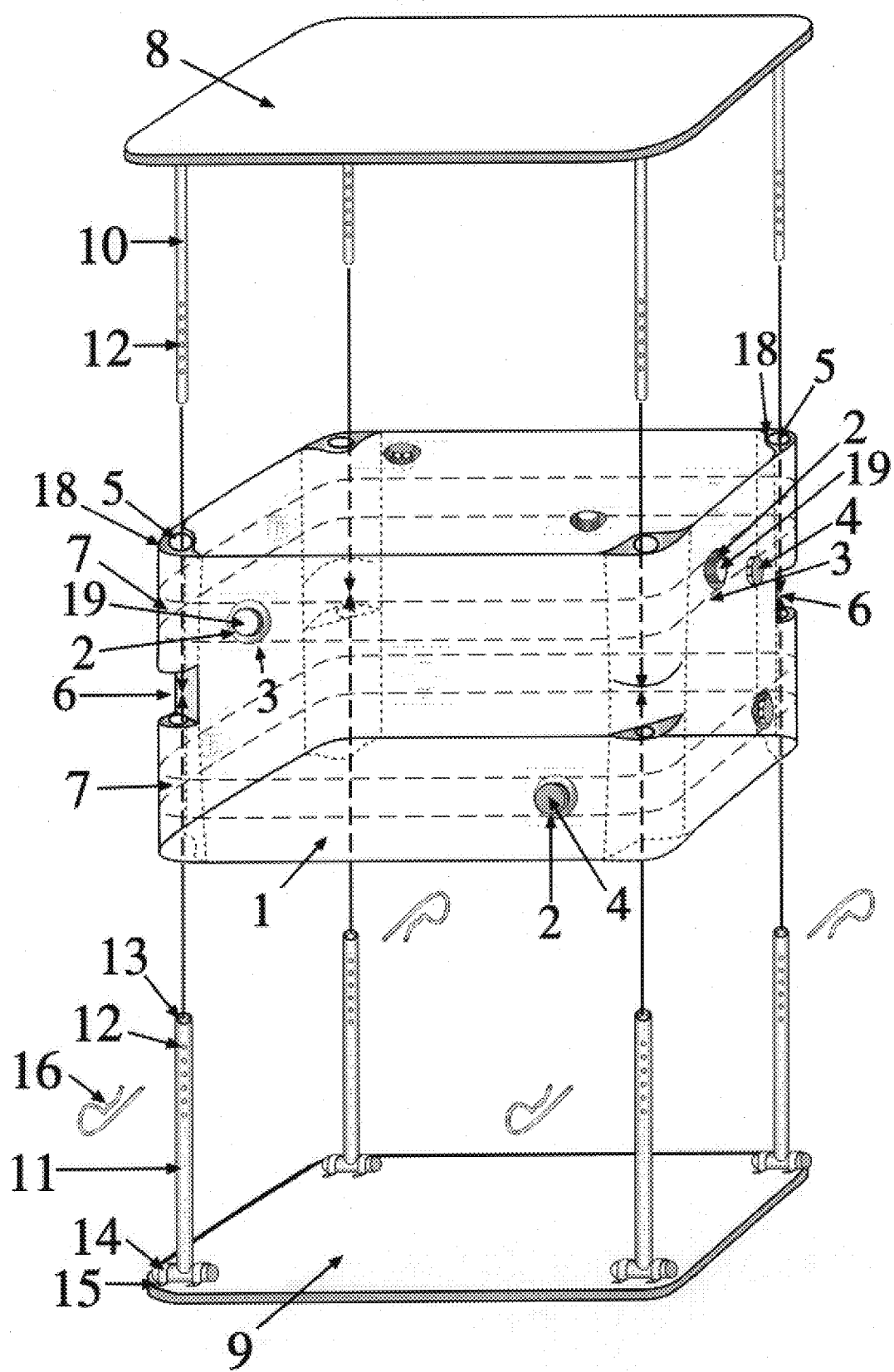
FIG. 5 is an exploded view of the preferred embodiment of the present invention having an expanded waterproof bag unit with vertically extending retaining sleeves on the four corner interfaces between its side surfaces, an outer frame top panel with downwardly extending rods positioned above the waterproof bag unit, and an outer frame bottom panel with upwardly extending tubes positioned below the waterproof bag unit; the connection tubes of the bottom panel each poised for insertion into one of the vertically extending waterproof bag unit retaining sleeves, the connection rods of the top panel poised for downward insertion into one of the connection tubes, with locking pins or locking clips positioned for insertion into holes located in the distal ends of the connection rods and connection tubes to secure the top and bottom panels in a fixed position relative to one another and thereby hold the waterproof bag unit between the top and bottom panels in a watertight configuration during use.

FIG. 2*a* shows top panel 8 with its four hinged connection rods 10 being extended prior to insertion into an opposed connection tube 11 and arrows indicating the direction of movement of each connection rod 10 during extension. FIG. 2*b* shows bottom panel 9 with its four hinged connection tubes 11 being extended prior to assembly and arrows indicating the direction of movement of each connection tube 11 during extension. FIGS. 2*a* and 2*b* each show a plurality of spaced-apart holes 12 in the distal ends of connection rods 10 and connection tubes 11, respectively. FIG. 2*b* further shows connection tubes 11 having a central bore 13 and being attached to bottom panel 9 with a hinge 14 and fasteners 15. In building a barrier or wall from the present invention, several bottom panels 9 would each be placed adjacent to one another with the flat surface to which connection tubes 11 are attached facing upward. After a waterproof bag 1, as shown in FIG. 4*a,* is placed on top of each bottom panel 9 with connection tubes 11 inserted through sleeve holes 5 at the corner interfaces of the side surfaces of waterproof bag 1, the connection rods 10 attached to a top panel 8 are each inserted into a different one of the connection tubes 11 and top panel 8 is lowered until top panel 8 comes in contact with the upper surface of waterproof bag 1. A quickly attached fastener, such as locking pin or clip 16 shown in FIG. 5, is then inserted into holes 12 in each paired connection rod 10 and connection tube 11 to lock them into a fixed position relative to one another. Generally and as most clearly illustrated in FIG. 6*b*, when opposing connection rods 10 and connection tubes 11 are fixed in position relative to one another, each connecting rod 10 does not necessarily become completely inserted into its paired connection tube 11. A fastener, such as locking pin or clip 16, extending completely through holes 12 in both connection rod 10 and connection tube 11 would provide the most secure connection for support of a waterproof bag 1. If a waterproof bag 1 is not filled prior to attachment of top panel 8, re-adjustment of one or more locking pins or clips 16 may be required to assure watertight contact between waterproof bag 1 and both top panel 8 and bottom panel 9. Top panels 8 and bottom panels 9 need to be manufactured from a rigid material that defines a uniform shape for waterproof bags 1 so that stable watertight barriers can be constructed from the present invention by unskilled labor with minimal attention to alignment during construction.

Figure 3A:
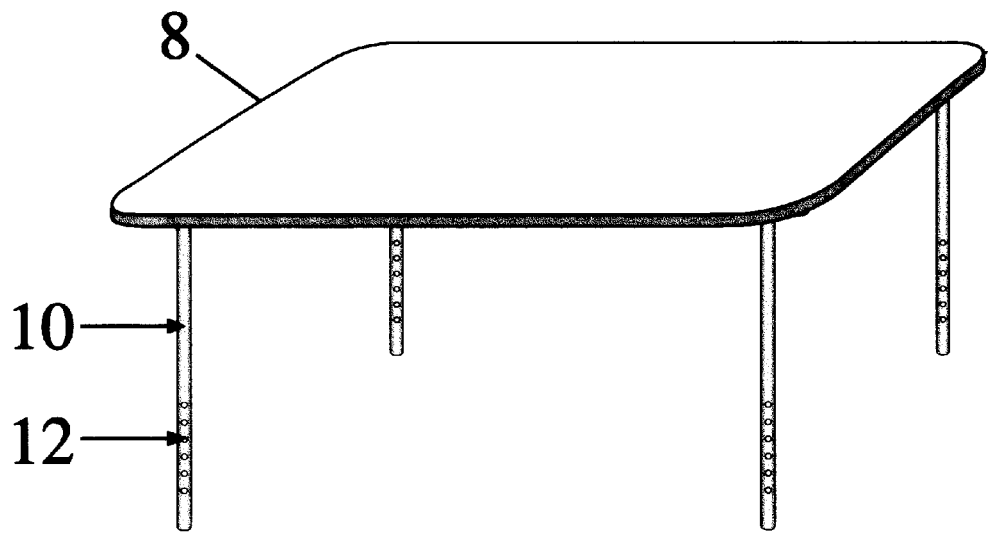
FIG. 3a is a perspective view of the preferred embodiment of the top panel with its four connection rods fully extended.
Figure 3B:
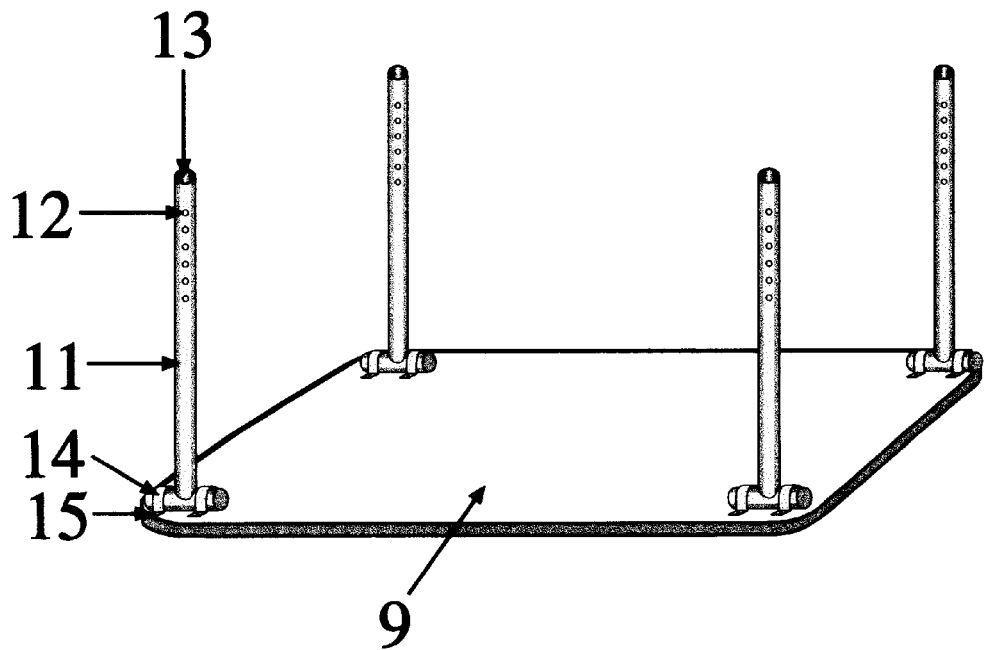
FIG. 3b is a perspective view of the preferred embodiment of the bottom panel with its four connection tubes fully extended.

FIG. 3*a* shows top panel 8 with its four pivotally attached connection rods 10 fully extended, while FIG. 3*b* shows bottom panel 9 with its four pivotally attached connection tubes 11 in a fully extended position. FIGS. 3*a* and 3*b* both show connection rods 10 and connection tubes 11, respectively, having a plurality of spaced-apart holes 12 in their distal ends. FIG. 3*b* further shows each connection tube 11 each having a longitudinal bore 13 through its distal end and its proximal end being attached to bottom panel 9 with a hinge 14 and fasteners 15. In FIG. 3*b* hinges 14 appear to be simple in construction and allow free 180° rotation of each connection tube 11 relative to the upper surface of bottom panel 9. However, the configuration of hinges 14 is not critical as long as they allow extension of connection tubes 11 between a fully retracted position against bottom panel 9, as shown in FIG. 1*b* and a fully extended position approximately perpendicular to bottom panel 9, as shown in FIG. 3*b*. Although not shown in FIG. 3*a*, it is contemplated for connection rods 10 to be pivotally attached to top panel 8 in the same manner used for attachment of connection tubes 11 to bottom panel 9 in FIG. 3*b*.

Figure 4B:
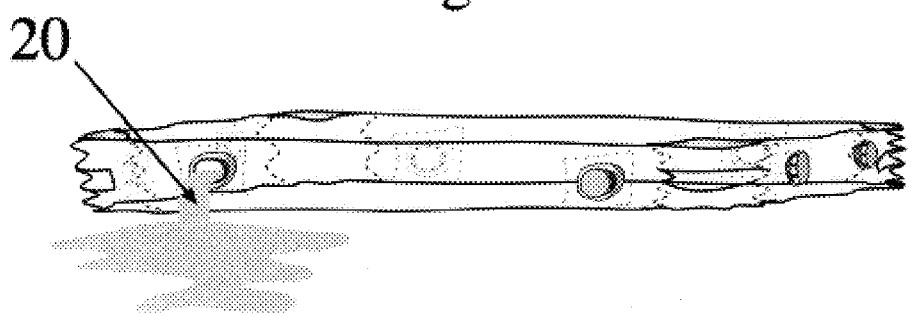
FIG. 4b is a perspective view of the preferred embodiment of the waterproof bag unit in a collapsed configuration for storage or transport.

FIG. 4*a* shows waterproof bag 1 in an expanded configuration and having two threaded hose connections 2 on each of its sides near to opposite corners, and also having a sleeve opening 5 as well as a sleeve opening reinforcement 18 on each of the four corner interfaces between its side surfaces. In the preferred embodiment it is contemplated for sleeve opening reinforcement 18 to be made from the same material as the remainder of waterproof bag 1, from several layers of the same material or a piece of the same material having a greater thickness dimension, or from a completely different waterproof material. FIG. 4*b* shows the same waterproof bag 1 shown in FIG. 4*a* in an almost fully collapsed configuration suitable for storage or transport, with fluid 20 draining from one of its hose connections 2. FIG. 4*a* shows a sleeve cutout 6 centrally in each corner interface of waterproof bag 1 between its side surfaces. When connection tubes 11 are inserted through sleeve openings 5 and connection rods 10 are each substantially inserted into an opposed connection tube 11, sleeve cutouts 6 expose holes 12 in connection tubes 11 and allow a fastener, such as locking pin or clip 16 shown in FIG. 5, to be inserted through holes 12 in both the distal ends of connection rods 10 and connection tubes 11 to secure them into a fixed position relative to one another. FIG. 4*a* further shows four hose connections 2 with caps 4 secured over them. The other two visible hose connections 2 shown in FIG. 4*a* have no cap 4, wherein a central aperture 19 through hose connection 2 and male threads are revealed. In addition, FIG. 4*a* shows of the hose connections 2 on the side surfaces of waterproof bag 1 to have a reinforcement patch 3 attached beneath it. It is contemplated for all hose connections 2 on waterproof bags 1 of the preferred embodiment of the present invention to have an associated reinforcement patch 3. Although the number of hose connections 2 is not critical, it is preferred that each of the six sides of rectangular waterproof bag 1 have two hose connections 2, for a total of twelve hose connections 2 per waterproof bag 1. Although it is considered within the scope of the present invention for hose connections 2 to be manufactured for movement between a recessed position while being sealed and an extended position during use for the addition of fluid 20 into the interior of waterproof bags 1, for simplicity of use, durability of waterproof bags 1, and reinforcement of a watertight seal it is preferred at all times for hose connections 2 to remain in a stationary position sufficiently recessed below the outer surface of waterproof bags 1 so that caps 4 attached to the hose connections 2 do not extend beyond the waterproof bag 1 surface. Also, although not critical and not shown, it is also contemplated that prior to sealing each hose connection 2 with a threaded cap 4 that an easily removed sealing insert could optionally be placed within central aperture 19 to prevent fluid leakage through the threads on cap 4 in instances where waterproof bag 1 would be subject to sudden impact. It is contemplated for the sealing insert (not shown) be similar to the type of seal having an attached removal ring and commonly used to block waterbed mattress fill holes prior to capping them.

It is contemplated for waterproof bags 1 to be made from a lightweight, rugged and flexible waterproof material, such as polyethylene, that has been fabricated to resist ultraviolet light. The thickness of the waterproof bag 1 material must be sufficient to give it the strength to resist punctures and tears during assembly and use. Further, it is contemplated for the thickness to increase as the fluid volume in different sizes of waterproof bags 1 increases. For example, a waterproof bag 1 having an approximate one cubic foot fluid volume would be required to have a thickness adequate for support of approximately seven-and-one-half gallons of fluid weighing close to eighty pounds, while a waterproof bag 1 having an approximate two cubic foot volume would be required to have a thickness adequate for support of approximately fifteen gallons of fluid weighing close to one-hundred-sixty pounds. Waterproof bags 1 can also be transparent, translucent, or opaque. Further, waterproof bags 1 can be made from tinted or colored materials, or those having many types of surface decoration, including but not limited to manufacturer identification information, company logos, and patent and trademark information. Optionally, the materials from which waterproof bags 1 are made can have reflective properties, bulletproof properties, resistance to the deteriorating effects of ultra-violet radiation, saltwater-resistance, or tolerance to a wide range of temperatures without becoming brittle. Also, in the most preferred embodiment waterproof bags 1 would be made from repeatedly recyclable materials, such as plastic. The dimensions of waterproof bags 1 would be dictated by the size of the top panel 8 and bottom panel 9 with which it would be used. To help form watertight barriers and walls, the sides of adjacent waterproof bags 1 in the same tier must be allowed to touch and the top and bottom surfaces of waterproof bags 1 must be fully in contact with its paired top panel 8 and bottom panel 9. It is contemplated that the materials used to make waterproof bags 1 would require minimal refurbishment between uses, usually no more than a cursory rinsing with water.

It is contemplated for waterproof bags 1 to be filled with fluid, such as fluid 20 in FIG. 4b, only after being placed into their usable positions. However, top panels 8 may be placed over waterproof bags 1 either prior to filling or subsequent thereto. As a result no handles have been provided on top panels 8 to lift waterproof bags 1. It is also contemplated for the filling of waterproof bags 1 in each tier of a barrier or wall under construction to be accomplished by one person using a garden hose having a typical internally threaded female connector, such as garden hose 17 in FIG. 7, attached to a municipal water supply, or in the alternative attached to a pump configured to draw water from a nearby pond, swimming pool, lake, river, creek, or the flood water itself. The hose or pump would be successively connected to one of the hose connections 2 on each waterproof bag 1 in a tier, after which the hose connection 2 would be sealed. Since hose connections 2 are located on all sides of each waterproof bag 1 and its top and bottom surfaces are interchangeable, the additional manipulation that would otherwise be required to determine an upright orientation is eliminated and the speed of barrier or wall assembly is thereby enhanced. Waterproof bags 1 can be drained by gravity through one or more of its lower hose connections 2, or through one or more of its upper hose connections 2 and by use of a pump (not shown) connected to any of its hose connections 2. Drying of waterproof bags 1 after use is also facilitated by the multiple hose connections 2 on opposing side surfaces. Also, since the most preferred embodiments of waterproof bags 1 are made from recyclable materials, their use has a low environmental impact as they can be easily disposed of through commonly available recycling facilities when they are no longer needed for use.

FIG. 5 shows a waterproof bag 1 expanded for assembly. In the preferred embodiment, waterproof bag 1 has a substantially rectangular configuration. However, each waterproof bag 1 is flexible and supported by a rigid outer frame made from top panel 8, bottom panel 9, connection rods 10, and connection tubes 11. Therefore it is the size and shape of the outer frame which ultimately determines the optimum position each waterproof bag 1 will assume in the creation of a watertight barrier or wall. FIG. 5 also shows waterproof bag 1 having two hose connections 2 on each of its visible surfaces near to opposite corners, so that the upper hose connection 2 can be used as an air vent and the lower one as a fill or drain opening. FIG. 5 also shows two horizontally extending reinforcement bands 7 around the four side surfaces of waterproof bag 1 which provide additional stability and durability to waterproof bag 1 during use. Although not shown, it is contemplated for the hidden surfaces of waterproof bag 1, its bottom, left side, and back surfaces, to also each have two hose connections 2 so that the top and bottom surfaces of waterproof bag 1 become interchangeable. Since a user would not have to determine the proper orientation of each waterproof bag 1 prior to use, less manipulation would be required during construction of barriers and walls from the present invention and the speed of construction would be enhanced. Although reinforcement bands 7 in FIG. 5 are shown attached to the inside surface of waterproof bag 1, as indicated by their dashed lines, it is considered within the scope of the present invention to also have reinforcement bands 7 attached to the outside surface of waterproof bag 1. In most applications, although not critical, it is contemplated for reinforcement bands 7 to be constructed from the same material used to manufacture its associated waterproof bag 1 and attached thereto with a bonding agent or adhesive (not shown). However, when attached to the outside surfaces of waterproof bags 1 intended for road construction use and traffic diversion, reinforcement bands 7 should be made from materials having highly reflective properties to enhance the visibility of waterproof bags 1 during low light conditions.

FIG. 5 also shows a connection tube 11 upwardly depending from each of the four corners of bottom panel 9, each positioned perpendicular to bottom panel 9 and attached thereon with hinges 14 and screws 15. Each connection tube 11 also has a plurality of spaced-apart holes 12 near to its distal end. FIG. 5 further shows one easily attached locking pin or clip 16 poised for connection to each connection tube 11. FIG. 5 also shows a connection rod 10 downwardly depending from each of the four corners of top panel 8, and each positioned perpendicular to top panel 8. Each connection rod 10 also has a plurality of spaced-apart holes 12 near to its distal end. Since it is contemplated for at least one hole 12 in both connection rods 10 and connection tubes 11 to be paired with one another for the insertion therethrough of a locking pin or clip 16 and for adjustment therebetween to be adjustable, when opposed connection rods 10 and connection tubes 11 are fixed into position relative to one another, connection rods 10 do not necessarily become fully inserted within an opposed connection tube 11. FIG. 5 further shows bottom panel 9 positioned under waterproof bag 1 with each connection tube 11 poised for insertion upward into a different sleeve opening 5 in the four corner interfaces between the side surfaces of waterproof bag 1. In contrast, top panel 8 is positioned over waterproof bag 1 with each connection rod 10 poised for insertion into one sleeve opening 5 in the corner interfaces between the side surfaces of waterproof bag 1. Each connection rod 10 is lowered into a different one of the sleeve openings 5 and becomes at least partially inserted within an opposed connection tube 11, as shown in FIGS. 6a, 6b, and 7. When top panel 8 and bottom panel 9 come in contact respectively with the upper and lower surfaces of a waterproof bag assembly 1, one locking pin or clip 16 or other quickly attached fastener would be inserted through holes 12 in both connection rods 10 and connection tubes 11 in each connected pair.

FIG. 5 further shows one hose connection 2 on each visible surface of waterproof bag 1 sealed with a cap 4, and the other hose connections 2 on each surface of waterproof bag 1 without cap 4 to reveal a center aperture 19. In the preferred embodiment all hose connections 2 are permanently recessed within waterproof bags 1 and do not extend beyond the outer surface of waterproof bag 1 During use, each hose connection 2 is covered with a cap 4 to seal it. FIG. 5 also shows a reinforcement patch 3 bonded to waterproof bag 1 in the area surrounding each hose connection 2, which provides additional durability in this area. As shown in FIG. 5, the use of two hose connections 2 on each surface of waterproof bag 1 provides convenience in both filling and draining waterproof bags 1 since the second hose connection 2 on each side of waterproof bag 1 can be used as an air vent. As a result, a person facing waterproof bags 1 will always have a readily accessible hose connection 2 that can be used as a drain hole and another which can be used as an air vent without removal of top panel 8 or access to the back side of a barrier or wall. Hose connections 2 are generally threaded to receive a standard one-half-inch inside diameter garden hose, such as hose 17 in FIG. 7, although it is considered within the scope of the present invention to have other application-dedicated thread configurations for hose connections 2. Any of the hose connections 2 on any surface of waterproof bag 1 may be used to pump fluid from it. However, if the upper hose connection 2 on a side surface is used to fill or drain waterproof bag 1, one of the hose connections 2 on the top surface or another side surface must be uncapped to facilitate air exchange. In the preferred embodiment of the present invention, the location and placement of hose connections 2 should be toward opposing corners of each waterproof bag 1 surface to allow complete filling of waterproof bags 1 prior to use with fluid, such as fluid 20 shown in FIG. 4b, as well as substantial draining of waterproof bags 1 prior to their separation from top panel 8 and bottom panel 9.

Also shown in FIG. 5 are sleeve openings 5, sleeve reinforcements 18, and sleeve cutouts 6 located on each corner of waterproof bag 1. In the preferred embodiment it is contemplated for sleeve reinforcements 18 to be constructed by bonding material similar to that used to manufacture waterproof bag 1, vertically along the corners of waterproof bag 1. Sleeve openings 5 accessed through a sleeve reinforcement 18 are dimensioned only slightly larger than the outside diameter of connection tubes 11 to allow for secure insertion of connection tubes 11 and connection rods 10 within each sleeve reinforcement 18 with minimal lateral movement. Sleeve cutouts 6 are centrally located along the corner interfaces between side surfaces of waterproof bag 1 and allow for direct rapid insertion of locking pin or clip 16 through holes 12 in the distal ends of connection tubes 11 and connection rods 10 which have been inserted within corresponding sleeve openings 5.

FIGS. 6a and 6b each show waterproof bags 1 assembled with an outer frame made from top panel 8 and bottom panel 9. In the preferred embodiment both waterproof bags 1 and their outer frames have a substantially rectangular configuration. Waterproof bags 1 substantially fill the space defined between top panel 8, bottom panel 9, connection rods 10, and connection tubes 11, and the side surfaces of adjacent waterproof bags 1 in a barrier or wall are expected to extend slightly beyond connection tubes 11 laterally to fully contact one another and provide a watertight connection therebetween. FIGS. 6a and 6b also each show two hose connections 2 on each visible surface of waterproof bag units 1. Each hose connection 2 is also shown secured to waterproof bags 1 with a reinforcement patch 3 and sealed with a cap 4. Hose connections 2 and caps 4 are recessed below the side surfaces of waterproof bags 1. Further, FIGS. 6a and 6b both show waterproof bags 1 each having two spaced-apart reinforcement bands 7 extending horizontally therearound and quickly attached locking pins or clips 16 centrally secured between top panel 8 and bottom panel 9 within sleeve cutouts 6 on each corner of waterproof bags 1. Top panel 8 and bottom panel 9 are approximately parallel to one another and in watertight contact with the upper and lower surfaces of waterproof bag 1, respectively. In addition, FIG. 6b reveals more clearly than in FIG. 6a the relative positioning of connection rods 10 and connection tubes 11 contemplated when fixed together with a locking pin or clip 16. FIG. 6b shows connection rods 10 substantially but not fully inserted within an opposed connection tube 11, and connection tubes 11 attached to bottom panel 9 with hinges 14 and screws 15. Holes 12 provide adjustment in the connection of rods 10 and opposing tubes 11 to allow top panel 8 to be secured against the upper surface of waterproof bag 1 as needed to provide a watertight seal.

FIG. 7 shows waterproof bag 1 in an expanded configuration and sandwiched between top panel 8 and bottom panel 9. Waterproof bag 1 has two hose connections 2 on each of its visible side surfaces near to opposite corners so that one hose connection 2 becomes an upper hose connection 2 and the other becomes a lower hose connection 2. It is contemplated for the hidden surfaces of waterproof bag 1 to also have two similarly positioned hose connections 2 thereon. FIG. 7 also shows a reinforcement patch 3 concentrically associated with each hose connection 2. The shape of reinforcement patch 3 is not critical and although FIG. 7 shows a rectangular reinforcement patch 3 it is considered within the scope of the present invention to have a round reinforcement patch 3 or any other shape selected for convenience during manufacture. In addition, FIG. 7 shows a garden hose 17 attached to one upper hose connection 2 and fluid 20 flowing into waterproof bag 1. Since the other three visible hose connections 2 all have attached caps 4, an upper hose connection 2 on a hidden side of waterproof bag 1 would be used as an air exchange vent. FIG. 7 further shows one locking pin or clip 16 in each sleeve cutout 6 for securing top panel 8 and bottom panel 9 together in an essentially parallel configuration that allows close watertight contact with the upper and lower surfaces of flexible waterproof bag 1. While the preferred embodiment of the present invention shown in FIG. 7 utilizes a rectangular panel configuration with four connection rods 10 and four connection tubes 11, it is considered within the scope of the present invention for top panels 8 and bottom panels 9 and the upper and lower surface of waterproof bags 1 to have alternate shapes, such as that of a hexagon, octagon, or other polygon with an even number of sides. Also, it is contemplated for other embodiments of the present invention to have more than four paired connection rods 10 and connection tubes 11. FIG. 7 also shows waterproof bag 1 configured to fit within its outer frame with minimal overhang between the top panel 8 and bottom panel 9 and the waterproof bag 1 they together support.

FIGS. 8a and 8b show connection rods 10 and connection tubes 11, respectively, each being T-shaped and having a round cross-sectional configuration, as previously shown in FIGS. 1a–3a and 1b–3b. As shown in FIGS. 1a, 2a, and 3a, connection rods 10 are each preferably positioned in one of the four corners of top panel 8 and are pivotally attached thereto with a hinge 14 and screws 15. FIGS. 1a, 2a, and 3a also show connection rods 10 as they rotate from their retracted positions in FIG. 1a against the lower flat surface of top panel 8 to their usable positions perpendicular the lower surface of top panel 8, as shown in FIG. 3a, with FIG. 2a showing the direction of movement from the retracted position to the usable perpendicular position. FIGS. 1b, 2b, and 3b show similar placement movement of connection tubes 11 relative to bottom panels 9. Although not critical, in the preferred embodiment it is contemplated for connection rods 10 and connection tubes 11 in the same water bag assembly to have the same length dimension. In FIG. 8a, two perspective views of a preferred embodiment of connection rods 10 are shown each associated with a hinge 14 and screws 15. The distal end of each connection rod 10 has six spaced-apart holes 12. The number and spacing of holes 12 is not critical, but must be adequate to allow adjustment of top panel 8 and bottom panel 9 against the upper and lower surfaces of a waterproof bag 1 for watertight contact therebetween. Although not shown in FIG. 8a, it is contemplated for holes 12 to be drilled perpendicular to the longitudinal axis of connection rods 10 and for opposed holes 12 to also be visible on the hidden surface of connection rods 10. The leftmost connection rod 10 in FIG. 8a shows connection rod 10 in a collapsed configuration as it would appear against top panel 8 when ready for storage or transport, as shown in FIG. 1a. The rightmost connection rod 10 in FIG. 8a shows connection rod 10 in the extended configuration, as shown in FIG. 3a. FIG. 8b shows two perspective views of a preferred embodiment of the connection tubes 11 of the present invention each associated with hinges 14 and screws 15. The distal end of each connection tube 11 has six spaced-apart holes 12. The number and spacing of holes 12 is not critical, but must be adequate to allow adjustment of top panel 8 and bottom panel 9 against the upper and lower surfaces of a waterproof bag 1 for watertight contact therebetween. Although not shown in FIG. 8b, it is also contemplated for holes 12 to be drilled perpendicular to the longitudinal axis of connection tubes 11 and for opposed holes 12 to also be visible on the hidden surface of connection tubes 11. FIG. 8b also shows connection tubes 11 each having a longitudinal bore 13 therethrough. It is contemplated for the inside diameter of bore 13 to be slightly larger than the outside diameter of connection rod 10 so that connection rod 10 is easily inserted into and removed from connection tube 11, but also so that connection rod 10 securely fits within connection tube 11 with minimum lateral movement. The leftmost connection tube 11 in FIG. 8b shows connection tube 11 in its extended usable configuration as shown in FIG. 3b, with the rightmost connection tube 11 in a collapsed configuration ready for transport or storage, as shown in FIG. 1b. In both FIGS. 8a and 8b hinges 14 have a simple U-shape construction with lateral flanges which allows free 180° movement of connection rods 10 and connection tubes 11 relative to top panel 8 and bottom panel 9, respectively, without stops. Although it is considered within the scope of the present invention for hinges 14 with stops to be used to provide orientation assistance for the rapid connection of rods 10 and tubes 11 to one another, in most applications of the preferred embodiment sleeve openings 5 adequately provide such assistance.

Figure 9:
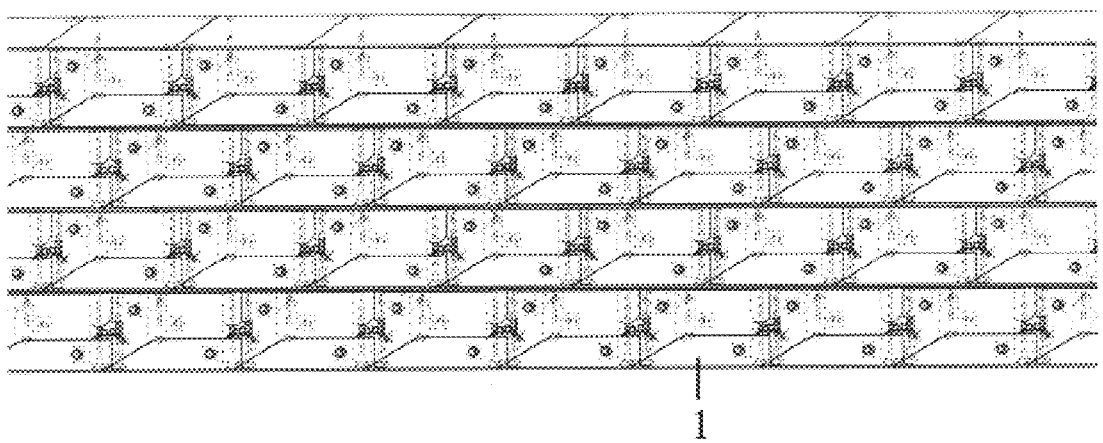
FIG. 9 is a perspective view of a watertight barrier constructed from several tiers water bag assemblies of the present invention each comprising an expanded waterproof bag unit supported by a top and bottom panel.

FIG. 9 shows waterproof bags 1 stacked vertically upon one another to form a four-tiered barrier or wall. FIG. 9 shows waterproof bags 1 in each next higher tier approximately centered over the interface between two waterproof bags 1 in the row immediately below it. While this type of offset placement would help to strengthen a barrier or wall made from waterproof bags 1, it is not critical to the present invention. FIG. 9 also shows the front edges of all waterproof bags 1 aligned with one another and all top panels 8 in each tier approximately level with one another. FIG. 9 further shows all top panels 8 and bottom panels 9 in lateral contact with those immediately adjacent thereto, as well as the side surface of each waterproof bag I facing the viewer having two hose connections 2. FIG. 9 does not show the ends of a barrier or wall made with offset placement of waterproof bags 1 to reveal the voids which would occur at the ends of alternating rows and the need for shorter water bag assemblies the fill such voids. Although not shown in FIG. 9 and not required for routine applications, cross connection between adjacent waterproof bags 1, waterproof bags 1 spaced apart from one another but in the same row, or waterproof bags 1 in different tiers can be achieved by affixing stretchable cords or cables to any of the holes 12 of connection tubes 11 exposed through sleeve cutouts 6 on selected waterproof bags 1. Generally, when cross connection is used on one side of a barrier or wall made from the present invention, although not critical, it is contemplated to have cross connection also on the opposed side of the barrier or wall.

Also not shown in FIG. 9, is contemplated use of more than one size of waterproof bag 1 in each barrier or wall depending upon the overall height required by the application. Water bag assemblies in higher tiers could each have a smaller height dimension for easier manipulation and filling at the higher elevation. It is also contemplated for any component of the water bag assemblies to be opaque, transparent, translucent, tinted, colored, or have identifying markings thereon. Further, it is contemplated for top panels 8 and bottom panels 9 to be made from materials containing gritted substances or materials enhanced by low-relief three-dimensional non-skid surface patterns to further provide a gripping watertight seal between adjacent tiers in a barrier or wall made from the present invention.

Assembly of a barrier or wall from the preferred embodiment of the present invention begins with the collection of components for each water bag assembly: top panel 8, bottom panel 9, waterproof bag 1, and four locking pins or clips 16. Connection rods 10 on each top panel 8 are rotated into their extended perpendicular positions, as shown in FIGS. 3a, and 6a. Similarly, connection tubes 11 on bottom panel 9 are also rotated into their perpendicular positions, as also shown in FIGS. 3b and 6b. Bottom panel 9 is placed on a flat surface with connection tubes 11 pointing in an upward direction. One waterproof bag 1 is placed over each bottom panel 9 and lowered so that each of the four connection tubes 11 become inserted into a different one of the sleeve openings 5 on waterproof bag 1 and until the lower surface of waterproof bag 1 comes to rest against bottom panel 9. There is no need to handle waterproof bags 1 to determine a correct orientation since waterproof bags 1 are symmetrical and all six of their sides have two hose connections 2. Waterproof bags 1 can be filled with fluid 20 either prior to or subsequent to the placement of top panel 8 over them, although prior to filling is preferred for most applications. When top panel 8 is placed over waterproof bag 1 and all four connection rods 10 are then inserted into an opposed sleeve opening 5 and subsequently into an opposed bore 13 in the distal end of a connection tube 11 until top panel 8 comes to rest against the upper surface of waterproof bag 1. Holes 12 on both connection rods 10 and connection tubes 11 must be aligned for a watertight fit between top panel 8, waterproof bag 1, and bottom panel 9, and to allow insertion of locking pin or clip 16 therethrough to fix each paired connection rod 10 and connection tube 11 to one another during use, as shown in FIG. 9. Since each waterproof bag 1 will be heavy when filled with fluid 20, a one cubic foot waterproof bag 1 having an approximate seven-and-one-half gallon capacity would weigh approximately eighty pounds, it should be placed into its usable position prior to filling. While FIG. 7 shows a standard garden hose 17 attached to a hose connection 2 and being used to fill waterproof bag 1 with water presumably from a municipal water source, a water pump (not shown) can also be used to fill waterproof bags 1 with water from rivers, swimming pools, creeks, ponds, lakes, as well as saltwater and flood water, or any other readily available fluid source. During the filling waterproof bags 1, connector caps 4 from a minimum of two hose connections 2 must be removed so that one upwardly positioned hose connection 2 can be used as an air exchange vent. As shown in FIG. 9, the waterproof bags 1 are positioned in direct contact with one another in several tiers to create a watertight barrier. Barriers of varying height may be easily created and more than one adjacent row of water bag assemblies may be used in application indicating the need for a stronger barrier than can be povided by one row of waterproof bags 1.

Once a watertight barrier or wall made of waterproof bags 1 is no longer needed, it can be easily dismantled. Two connector caps 4 are removed from each waterproof bag 1, typically the lower hose connector 2 and the upper hose connector 2 on one of its side surfaces. Either gravity or a pump (not shown) can be used to drain fluid 20 from waterproof bags 1. When fully or at least substantially drained, each water bag assembly can be disassembled at the barrier or wall construction site, or in the alternative remotely cleaned and/or disassembled. To disassemble each water bag assembly, locking pins or clips 16 must first be removed from the holes 12 in both connection rods 10 and connection tubes 11. Top panel 8 is lifted vertically from waterproof bag 1 until connection rods 10 become removed from sleeve openings 5. Connection rods 10 are each then rotated to their retracted positions against top panel 8, as shown in FIG. 1*a*, to prepare top panel 8 for storage or transport. Waterproof bag 1 would then be lifted vertically from bottom panel 9 until connection tubes 11 are completely withdrawn from sleeve openings 5. Caps 4 can be replaced over threaded hose connections 2 after waterproof bag 1 are collapsed for storage, or in the alternative caps 4 can be separately stored to allow the interior of waterproof bags 1 to dry prior to subsequent use. Connection tubes 11 are also rotated to their retracted positions against bottom panel 9, as shown in FIG. 1*b*, to prepare it for storage or transport to a new barrier location.

The present invention can also be used to create temporary shelters of varying height for people, equipment, and supplies. Once walls are made from the water bag assemblies, one or more tarps or other covering (not shown) can be placed over them. One means of securing tarps over a barrier or wall made from water bag assemblies would be to connect grommets in the tarps with bungee cords (not shown) or locking pins or clips 16 to any of the holes 12 in connection tubes 11 exposed through sleeve cutouts 6. When bulletproof materials are used for waterproof bags 1, the present invention can be used by military personnel to construct bunkers. The present invention could also be used to mark areas of unsafe pavement in road construction zones, instead of the barriers, barrels, and cones now used which are either heavier than the present invention and more difficult to transport to a new location, or so light that they are easily and frequently blown away from their needed locations during use. The present invention could also be used to construct temporary barriers that prevent or reduce soil erosion, as well as the containment of hazardous material spills as long as they are made from materials suitably resistant for the application. Since the waterproof bags 1 have a compact footprint, stacked waterproof bags 1 can also be used for the temporary storage or stockpiling of water and other fluids. In areas subject to severe storms or other predictable natural disasters, such as hurricanes and typhoons, waterproof bags 1 can serve a dual purpose. They can be filled beforehand with potable water. Then after the potable water is consumed each waterproof bag 1 can be re-filled with non-potable water or other readily available fluid-like material suitable for pumping or siphoning into them and stacked to construct protective barriers or walls for temporary shelters.

What is claimed is:

1. A system for construction of multiple purpose watertight barriers and walls of different height by unskilled labor with no hand tools, said system comprising a plurality of rigid top panels each having a bottom surface with a plurality of connection rods pivotally attached thereto, said top panels each being made from gripping materials which have resistance to shearing forces, and said connection rods each having an outside diameter;

a plurality of rigid bottom panels each having a top surface with a plurality of connection tubes pivotally attached thereto, said bottom panels each being made from gripping materials which have resistance to shearing forces, and said connection tubes each having an inside diameter slightly larger than said outside diameter of said connection rods;

a plurality of flexible and rugged fluid-fillable waterproof bag units each having a plurality of vertically extending sleeves configured for receiving said connection tubes and said connection rods, said bag units also each having an upper surface, a lower surface, and a plurality of side surfaces, said bag units each further having hose connection means on each of said top surfaces, each of said bottom surfaces, and each of said side surfaces, said hose connection means adapted for introducing non-flammable fluid into and removing non-flammable fluid from said bag units, and said bag units also each having a configuration and dimension adapted for substantially filling the volume defined between one of said top panels and one of said bottom panels when opposed ones of said connecting tubes and said connecting rods become joined; and quickly attached fastening means adapted for fixedly connecting opposed ones of said connection tubes and said connection rods to one another so as to secure and maintain said bag units in an optimum watertight orientation between one of said top panels and one of said bottom panels during use, and so that said bag units are each caused to extend slightly beyond the associated ones of said top panels and said bottom panels to allow watertight lateral contact between adjacently placed ones of said bag units.

2. The system of claim 1 wherein said connection tubes and said connection rods are each straight-walled and T-shaped.

3. The system of claim 2 wherein each of said top panels further comprise two U-shaped hinges without stops pivotally attached between each of said connection rods and the associated one of said top panels, and wherein each of said bottom panels further comprise two U-shaped hinges without stops pivotally attached between each of said connection tubes and the associated one of said bottom panels.

4. The system of claim 1 wherein said bottom surfaces of top panels, said top surfaces of said bottom panels, and said upper and lower surfaces of said bag units each have a rectangular configuration of substantially similar dimension.

5. The system of claim 1 wherein said hose connection means further comprises a plurality of externally-threaded hose connections and internally-threaded caps configured for watertight sealing of said hose connections.

6. The system of claim 1 wherein each of said bag units further comprises at least one horizontally extending reinforcement band therearound.

7. The system of claim 1 wherein said quickly attached fastening means is selected from the group consisting of easily attached locking pins and easily attached locking clips.

8. The system of claim 7 wherein said vertically extending sleeves each have a central gap for attachment of said fastening means to said connection tubes.

9. The system of claim 1 further comprising sleeve opening reinforcements.

10. The system of claim 1 further comprising a hose connection reinforcement patch associated with each of said hose connections.

11. The system of claim 1 wherein said bag units are selected from the group of bag units having light-reflective materials, salt-resistant materials, ultra-violet radiation resistant materials, bulletproof materials, recycled materials, plastic materials, rubber materials, rubber-like materials, materials having resistance to shearing forces, materials with resistance to a wide range of temperature fluctuations without becoming brittle, opaque materials, transparent materials, translucent materials, colored materials, tinted materials, and materials having surface markings.

12. A system for construction of multiple purpose watertight barriers and walls of different height by unskilled labor with no hand tools, said system comprising a plurality of rigid top panels each having a bottom surface with a plurality of connection rods pivotally attached thereto, said top panels each being made from gripping materials which have resistance to shearing forces, and said connection rods each having an outside diameter;

a plurality of rigid bottom panels each having a top surface with a plurality of connection tubes pivotally attached thereto, said bottom panels each being made from gripping materials which have resistance to shearing forces, and said connection tubes each having an inside diameter slightly larger than said outside diameter of said connection rods;

a plurality of flexible and rugged fluid-fillable waterproof bag units each having a plurality of vertically extending sleeves configured for receiving said connection tubes and said connection rods, each of said sleeves each having a central gap configured for providing access to said connection tubes, said bag units also each having an upper surface, a lower surface, and a plurality of side surfaces, said bag units each further having a plurality of externally-threaded hose connections and internally-threaded caps configured for watertight sealing of said hose connections on each of said top surfaces, each of said bottom surfaces, and each of said side surfaces, said hose connections configured for introducing non-flammable fluid into and removing non-flammable fluid from said bag units, and said bag units also each having a configuration and dimension adapted for substantially filling the volume defined between one of said top panels and one of said bottom panels when opposed ones of said connecting tubes and said connecting rods become joined; and quickly attached fastening means adapted for fixedly connecting opposed ones of said connection tubes and said connection rods to one another so as to secure and maintain said bag units in an optimum watertight orientation between one of said top panels and one of said bottom panels during use, and so that said bag units are each caused to extend slightly beyond the associated ones of said top panels and said bottom panels to allow watertight lateral contact between adjacently placed ones of said bag units.

13. The system of claim 12 further comprising components selected from the group consisting of connection tubes and said connection rods which are each straight-walled and T-shaped; horizontally extending reinforcement bands attached around said water bag units; sleeve opening reinforcements; and hose connection reinforcement patches configured for strengthening each of said hose connections during use.

14. The system of claim 12 wherein each of said top panels further comprise two U-shaped hinges without stops pivotally attached between each of said connection rods and the associated one of said top panels, and where in each of said bottom panels further comprise two U-shaped hinges without stops pivot ally attached between each of said connection tubes and the associated one of said bottom panels.

15. The system of claim 12 wherein said bottom surfaces of top panels, said top surfaces of said bottom panels, and said upper and lower surfaces of said bag units each have a rectangular configuration of a substantially similar dimension.

16. The system of claim 12 wherein said quickly attached fastening means is selected from the group consisting of easily attached locking pins and easily attached locking clips.

17. The system of claim 12 wherein said bag units are selected from the group of bag units having light-reflective materials, salt-resistant materials, ultra-violet radiation resistant materials, bulletproof materials, recycled materials, plastic materials, rubber materials, rubber-like materials, materials having resistance to shearing forces, materials with resistance to a wide range of temperature fluctuations without becoming brittle, opaque materials, transparent materials, translucent materials, colored materials, tinted materials, and materials having surface markings.

18. A method of constructing a temporary, fluid-filled barrier, said method comprising the steps of providing a plurality of rigid bottom panels each being identical in configuration to one another and each having at least four pivoting connection tubes attached thereto, a plurality of rigid top panels each being identical in configuration to said bottom panels and having at least four pivoting connection rods attached thereto, a plurality of fasteners, a positive pressure source of fluid fill material, a hose having an internally-threaded connection on one of its ends, and a plurality of rugged flexible waterproof bag units each having at least two externally-threaded fill-holes on each of its sides, a number of sleeves identical to the number of connection tubes, and a size and configuration capable when filled with fluid of substantially filling the volume created between one of said top panels and one of said bottom panels when said connection tubes and said connection rods attached thereto respectively are fixed in position relative to one another;

placing a first one of said bottom panels with said connection tubes facing upward on an essentially flat surface where construction of a barrier is desired;

pivoting each of said connection tubes attached to said first bottom panel upwardly so that said connection tubes are essentially perpendicular to said first bottom panel;

aligning said sleeves on a first one of said empty waterproof bag units with said connection tubes;

sliding said connection tubes through said sleeves until the bottom surface of said first waterproof bag unit becomes positioned against said bottom panel;

connecting said internally-threaded end of said hose to one of said externally-threaded fill-holes on the top surface of said first waterproof bag unit;

connecting one end of said hose to said positive pressure source of fluid fill substance;

essentially filling said first waterproof bag unit with fluid;

sealing said threaded fill-hole to retain said fluid within said waterproof bag unit;

pivoting each of said connection rods attached to a first one of said top panels downwardly so that said connection rods are essentially perpendicular to said first top panel;

aligning each of said connection rods on said first top panel with a paired one of said connection tubes on said first bottom panel;

sliding each of said connection rods into a paired one of said connection tubes until said top panel becomes positioned against the top surface of said first waterproof bag unit;

using at least one of said fasteners to secure each of said paired connection tubes and rods in a fixed position relative to one another;

to complete a first tier of said barrier repeating said steps of placing said bottom panels on said flat surface, upwardly extending said connection tubes, aligning said sleeves with said connection tubes, sliding said connection tubes through said sleeves, connecting said hose to said positive pressure fluid source, connecting said hose to said waterproof bag unit, filling said waterproof bag units with fluid, downwardly extending said connection rods, aligning said connection rods with said connection tubes, sliding said connection rods into said connection tubes, and using said fasteners to secure said connection tubes and rods into fixed positions; and completing upper tiers of said barrier in a manner identical to said construction of said first tier after first placing said bottom panels of each of said upper tiers on top of said top panels in the next lower tier.

19. The method of claim 18 further comprising the steps of providing waterproof bag units selected from the group consisting of waterproof bag units having light-reflective materials, salt-resistant materials, ultra-violet radiation resistant materials, bulletproof materials, recycled materials, plastic materials, rubber materials, rubber-like materials, materials resistant to shearing forces, materials resistant to a wide range of temperature fluctuations without becoming brittle, opaque materials, transparent materials, translucent materials, colored materials, tinted materials, and materials having surface markings, horizontally extending reinforcement bands therearound, sleeve opening reinforcements, and hose connection reinforcement patches.

20. The method of claim 18 further comprising the steps of providing fasteners selected from the group consisting of quickly applied locking pins and quickly applied locking clips.

* * * * *